(12) United States Patent
Praturi et al.

(10) Patent No.: US 7,042,995 B1
(45) Date of Patent: May 9, 2006

(54) PROVIDING FEATURES TO A SUBSCRIBER IN A TELECOMMUNICATIONS NETWORK

(75) Inventors: Prasad Praturi, Plano, TX (US); Sankara S. Manepalli, Richardson, TX (US); Kasturi Narayanan, Richardson, TX (US); Yifu Yang, Plano, TX (US); Pravin Kumar Khandelwal, Richardson, TX (US)

(73) Assignee: Cisco Technology, Inc., San Jose, CA (US)

( * ) Notice: Subject to any disclaimer, the term of this patent is extended or adjusted under 35 U.S.C. 154(b) by 994 days.

(21) Appl. No.: 09/948,314

(22) Filed: Sep. 6, 2001

Related U.S. Application Data

(60) Provisional application No. 60/231,831, filed on Sep. 6, 2000.

(51) Int. Cl.
*H04M 3/42* (2006.01)
*H04M 7/00* (2006.01)

(52) U.S. Cl. .................................. 379/207.02; 379/229

(58) Field of Classification Search ........... 379/207.02, 379/201.01–201.03, 201.12, 229, 230
See application file for complete search history.

(56) References Cited

U.S. PATENT DOCUMENTS

| | | | | |
|---|---|---|---|---|
| 6,038,309 | A * | 3/2000 | Ram et al. | 379/229 |
| 6,535,598 | B1 * | 3/2003 | Lehtinen | 379/219 |
| 6,665,537 | B1 | 12/2003 | Lioy | 455/435 |
| 2002/0085696 | A1 * | 7/2002 | Martin et al. | 379/201.03 |

OTHER PUBLICATIONS

U.S. Appl. No. 09/948,288, filed Sep. 6, 2001, entitled "*Processing A Subscriber Call In A Telecommunications Network*", 103 total pages.
U.S. Appl. No. 09/948,220, filed Sep. 6, 2001, entitled "*Data Communication Among Processes Of A Network Component*," 106 total pages.
U.S. Appl. No. 09/947,743, filed Sep. 6, 2001, entitled "*Managing Processes Of A Network Component*," 105 total pages.
U.S. Appl. No. 09/948,420, filed Sep. 6, 2001, entitled "*Communicating Messages In A Multiple Communication Protocol Network*", 111 total pages.
U.S. Appl. No. 09/948,216, filed Sep. 6, 2001, entitled "*Data Replication For Redundant Network Components*," 108 total pages.
U.S. Appl. No. 09/948,316, filed Sep. 6, 2001, entitled "*Recording Trace Messages Of Processes Of A Network Component*," 104 total pages.
U.S. Appl. No. 09/948,474, filed Sep. 6, 2001, entitled "*Managing Redundant Network Components*," 105 total pages.
U.S. Appl. No. 09/948,318, filed Sep. 6, 2001, entitled "*Media Gateway Adapter*," 103 total pages.
U.S. Appl. No. 09/948,315, filed Sep. 6, 2001, entitled "*Software Upgrade Of Redundant Network Components*," 104 total pages.

* cited by examiner

*Primary Examiner*—Benny Q. Tieu
(74) *Attorney, Agent, or Firm*—Baker Botts L.L.P.

(57) ABSTRACT

A method for providing a feature in a telecommunications network is disclosed. Signals representing a call are received at a call agent to generate a detection point. The call is associated with a service identifier corresponding to a set of features. A feature server is identified from a number of feature servers. The identified feature server is notified of the detection point. The signals are processed in response to the detection point to provide a feature from the set of features.

37 Claims, 25 Drawing Sheets

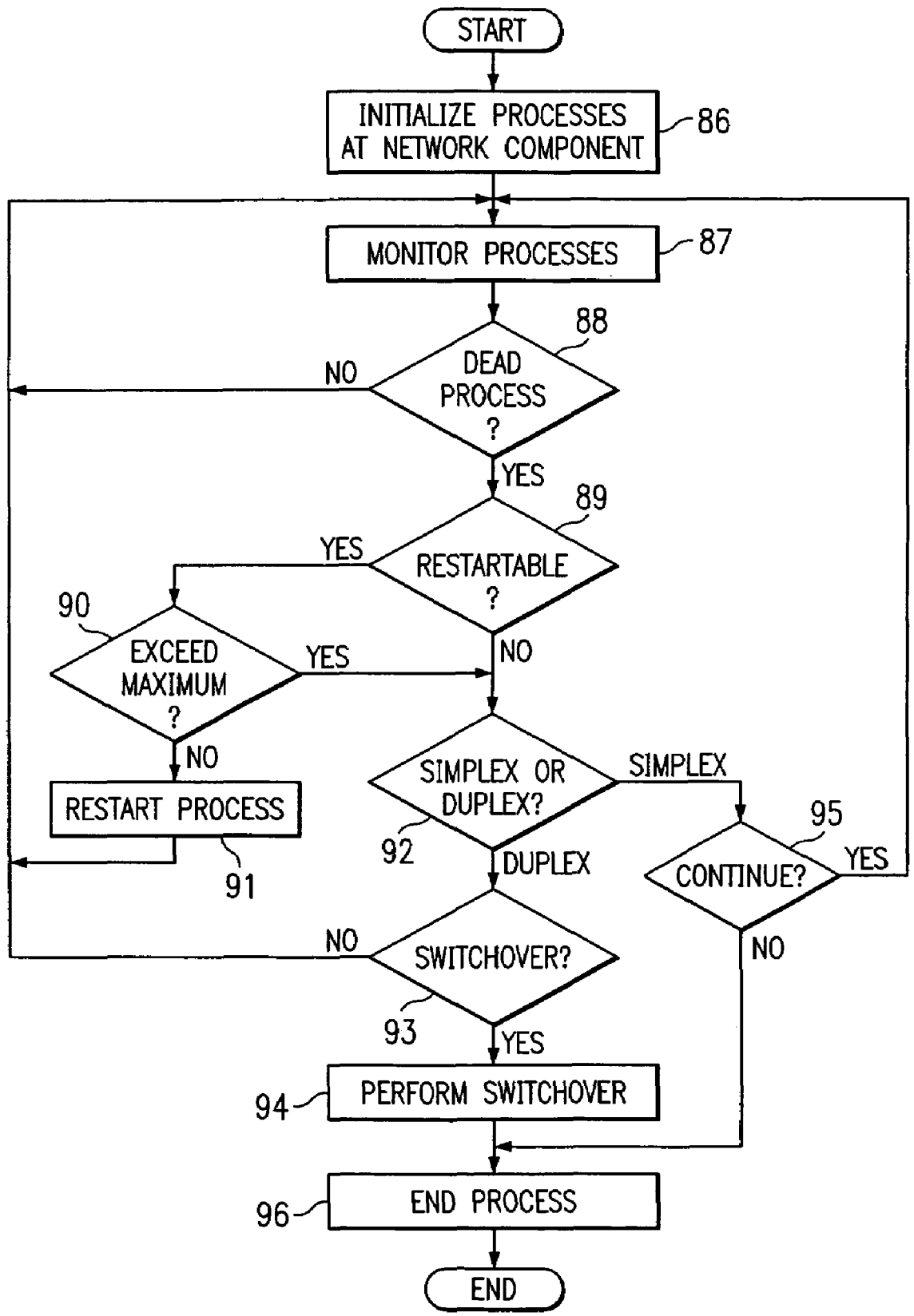

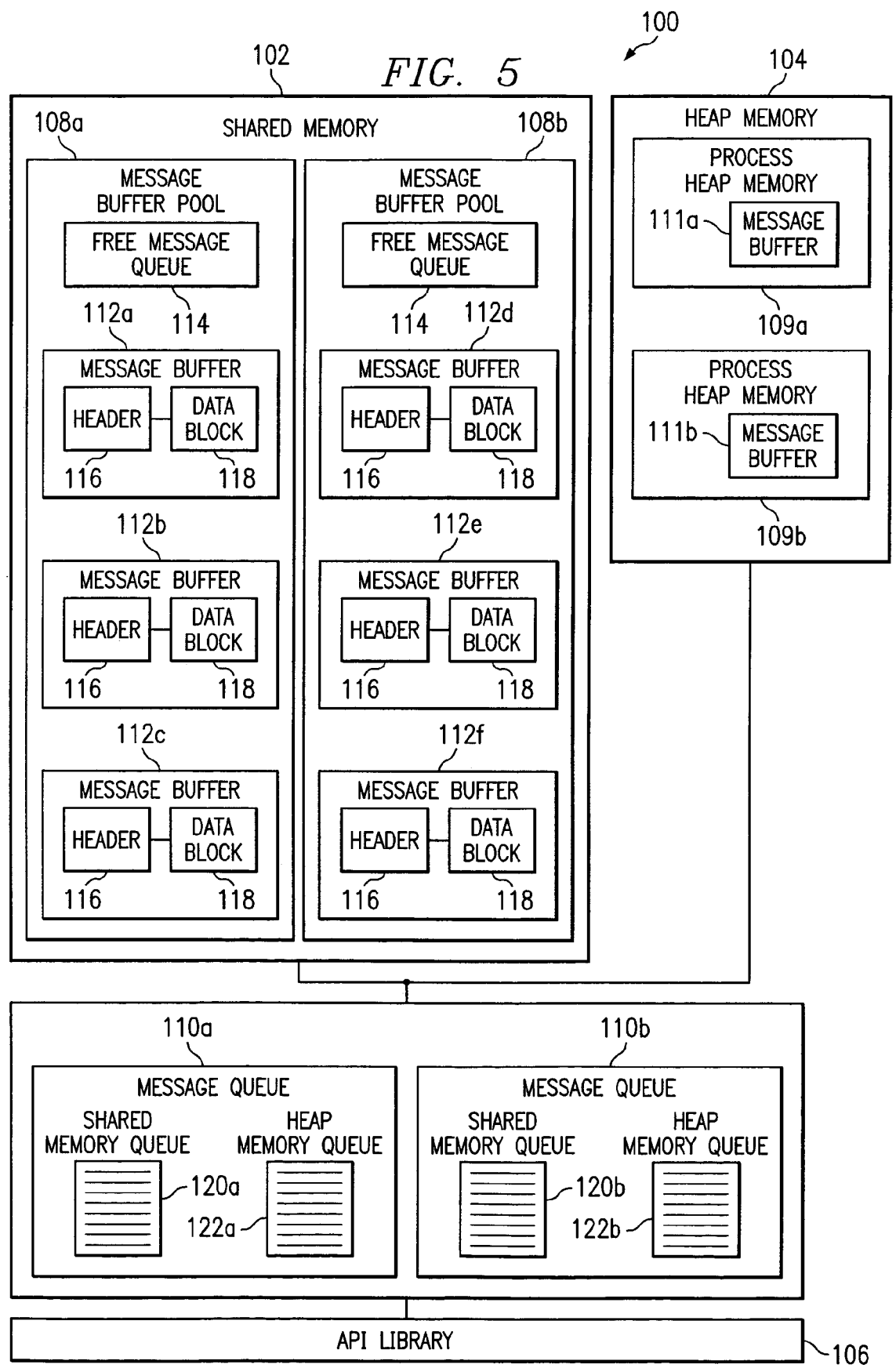

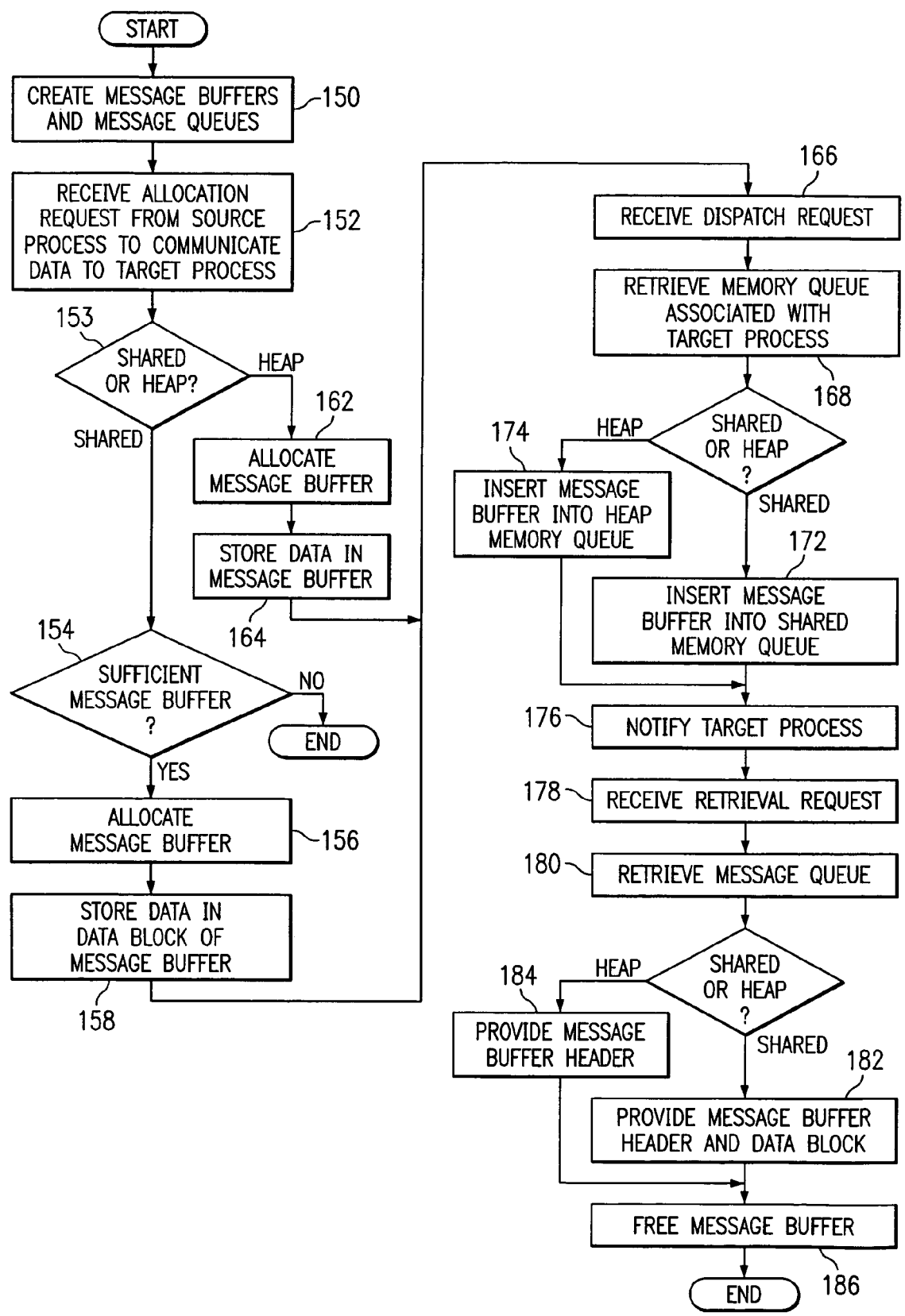

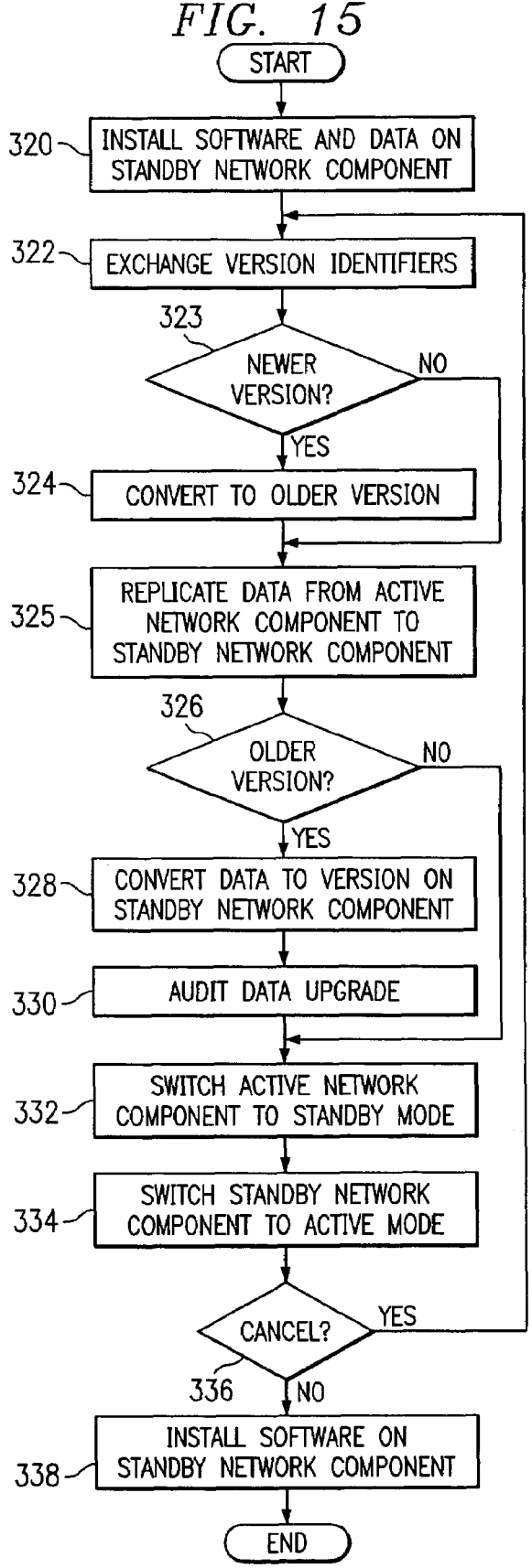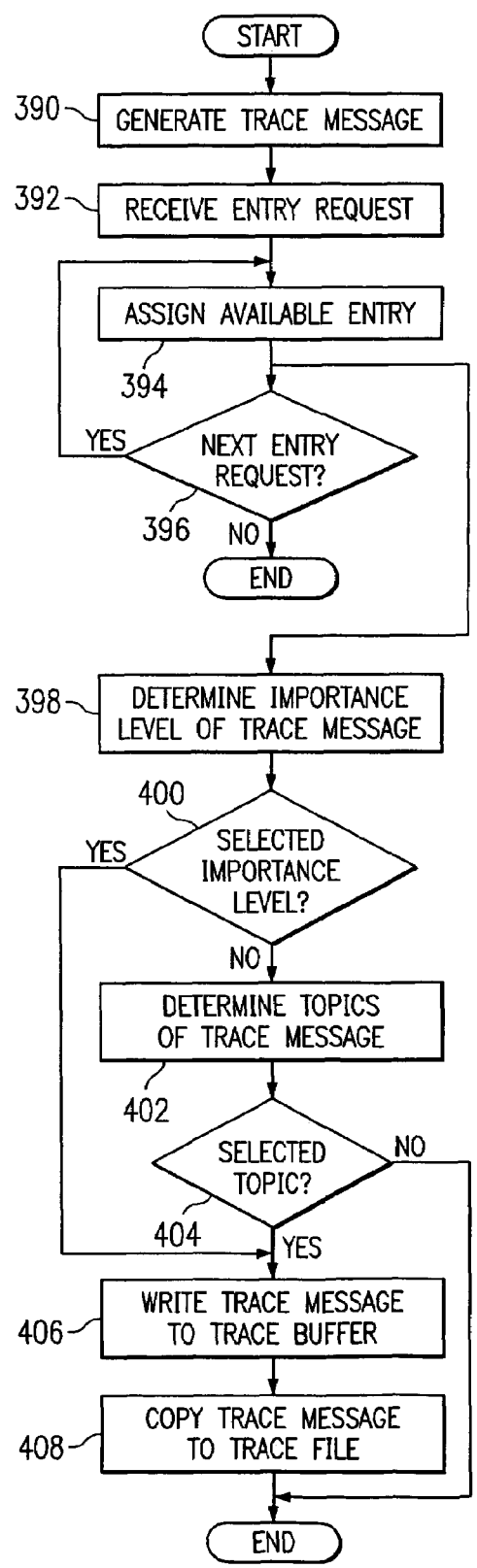

340a

VERSION 1

| SUBSCRIBER ID | PHONE NUMBER | CALL WAITING | CALL FORWARDING |
|---|---|---|---|
| JOHN DOE | 000-000-0000 | Y | N |
| JANE DOE | 111-111-1111 | N | N |

VERSION 2

| SUBSCRIBER ID | PHONE NUMBER | CALL WAITING | CALL FORWARDING | CONFERENCE |
|---|---|---|---|---|
| JOHN DOE | 000-000-0000 | Y | N | N |
| JANE DOE | 111-111-1111 | N | N | Y |

VERSION 2+n

| SUBSCRIBER ID | PHONE NUMBER | CALL WAITING | CALL FORWARDING | CONFERENCE | ZOOM |
|---|---|---|---|---|---|
| JOHN DOE | 000-000-0000 | Y | N | N | Y |
| JANE DOE | 111-111-1111 | N | N | Y | N |

VERSION 2+n+1

| SUBSCRIBER ID | PHONE NUMBER | CONFERENCE | ZOOM |
|---|---|---|---|
| JOHN DOE | 000-000-0000 | N | Y |
| JANE DOE | 111-111-1111 | Y | N |

*FIG. 16D*

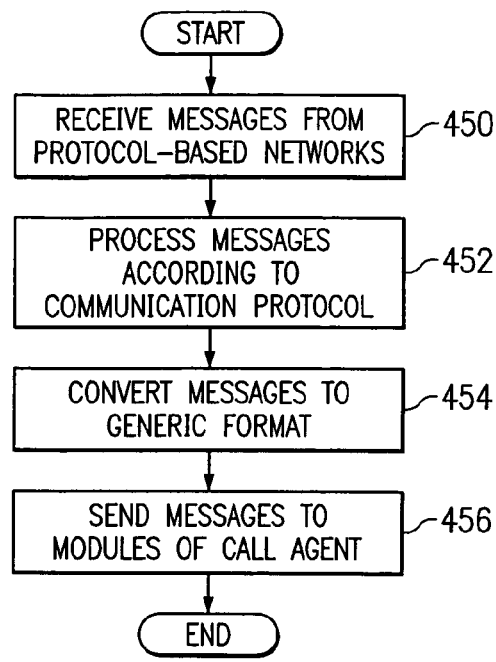
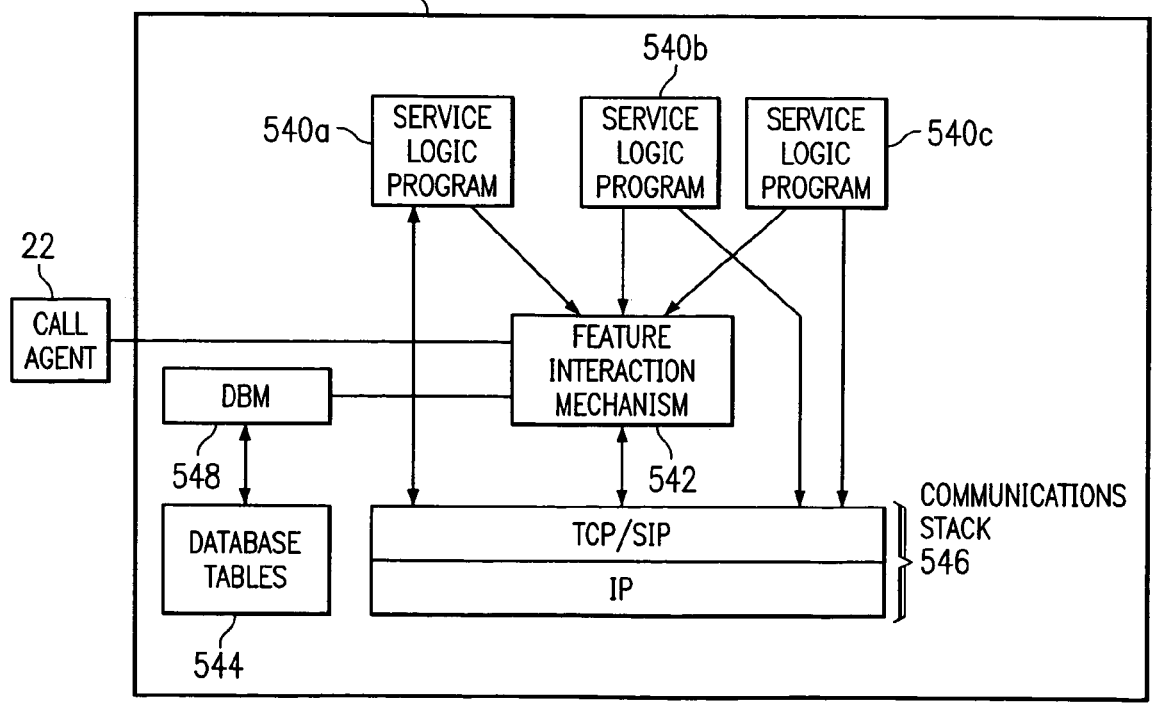

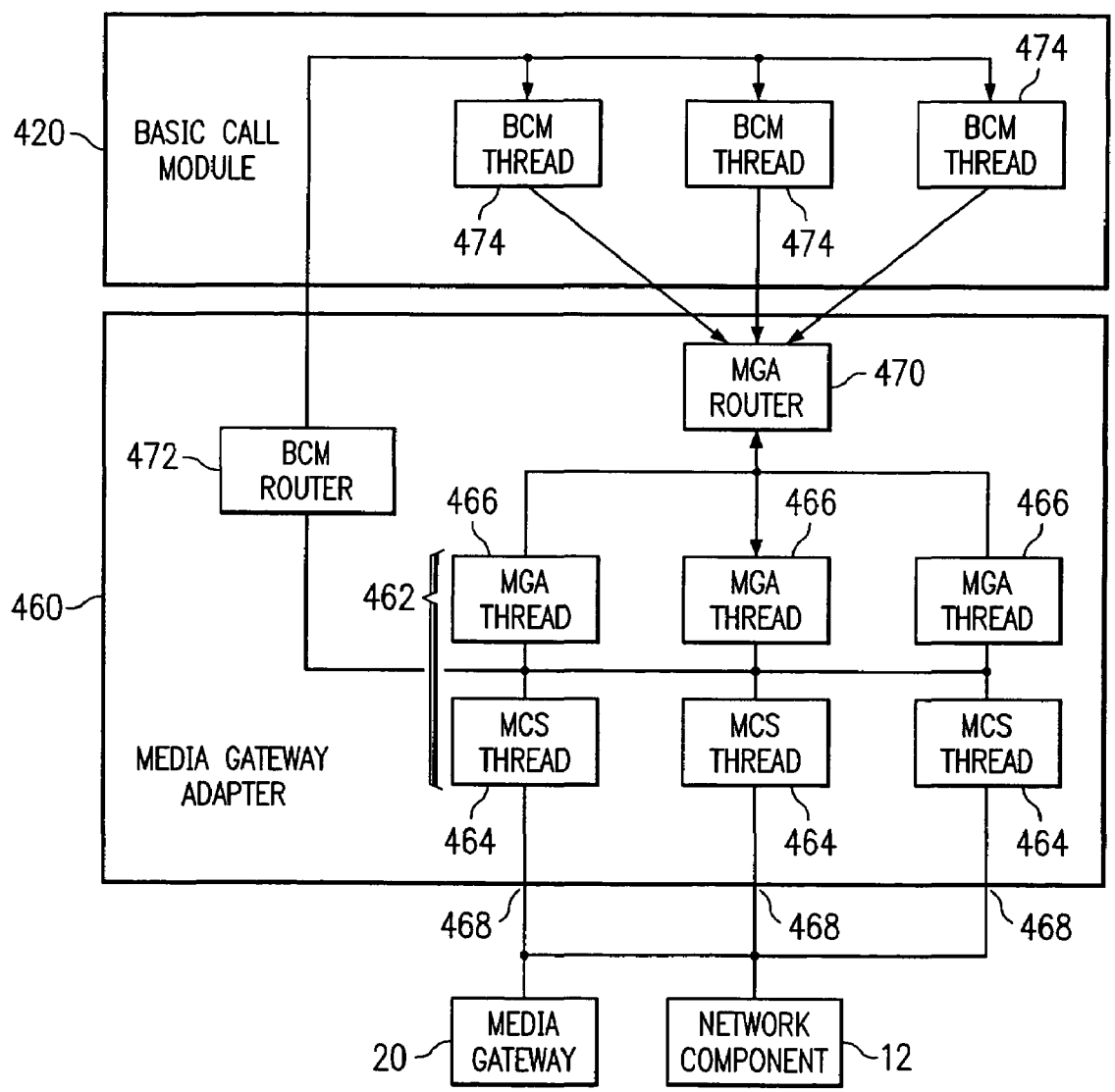

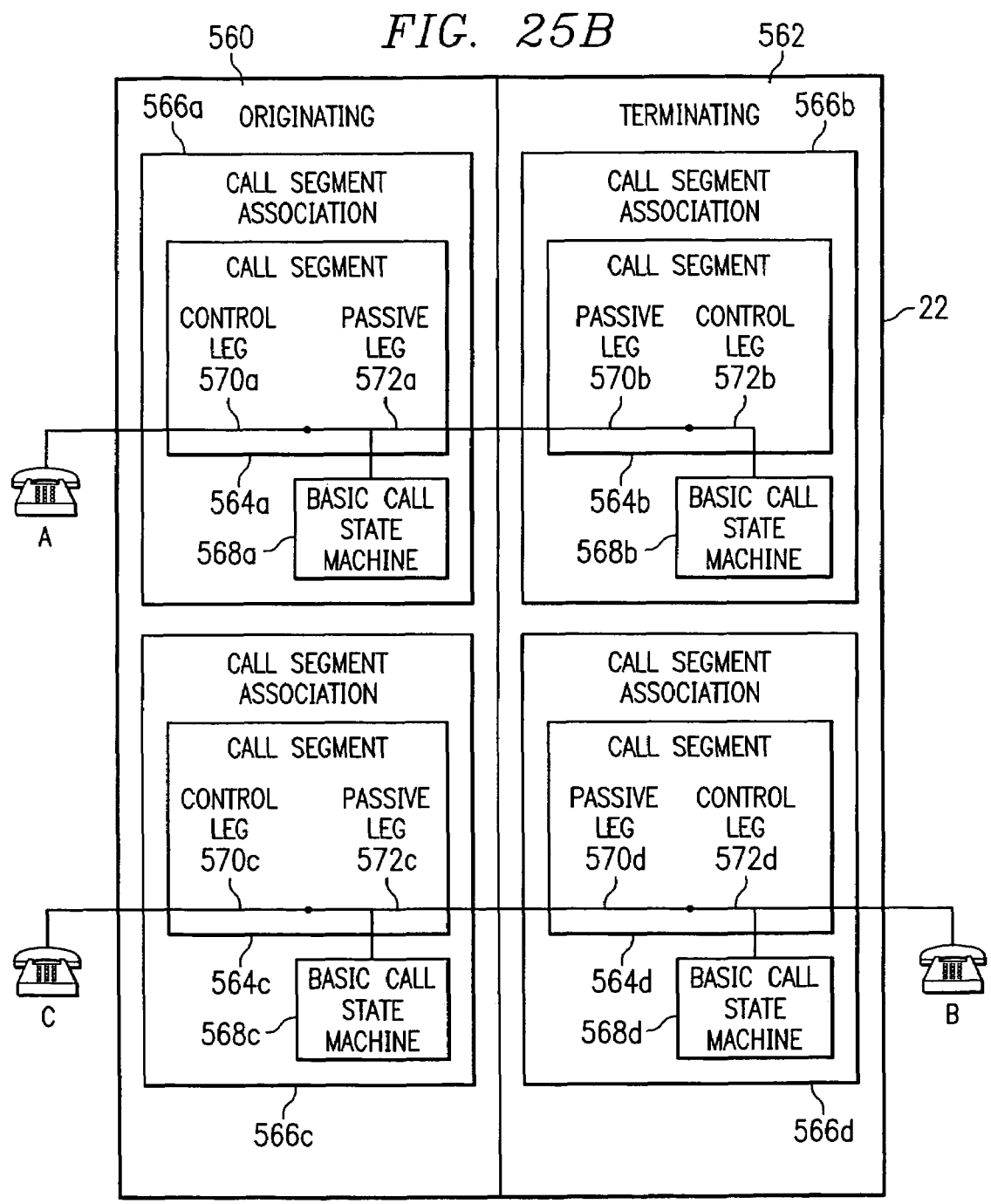

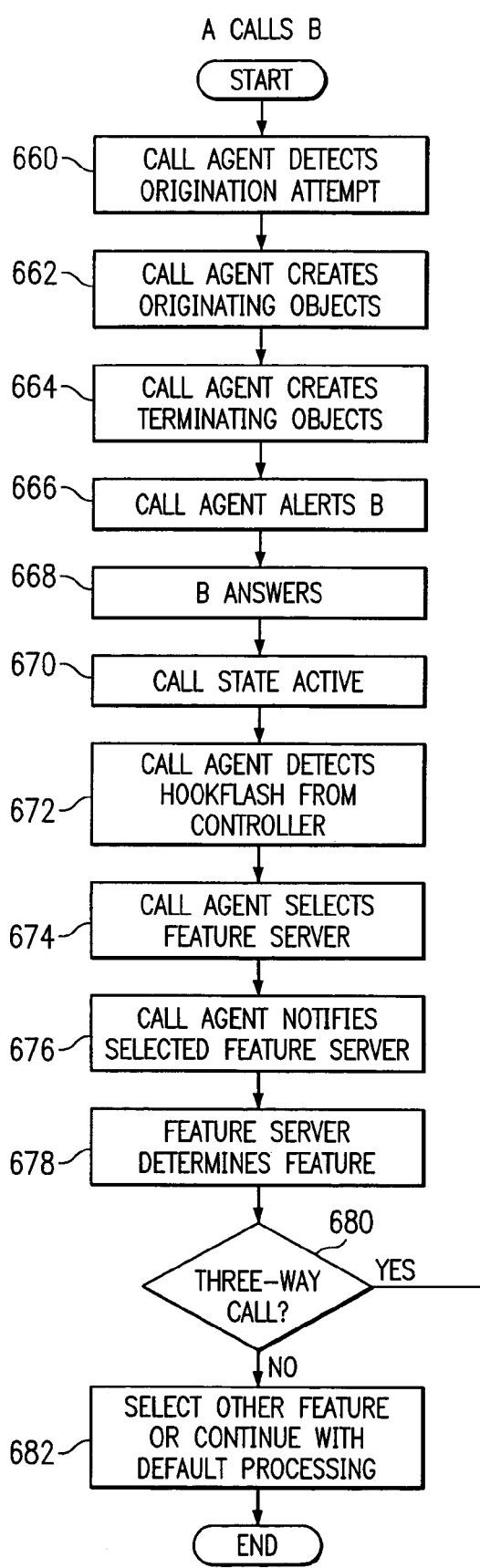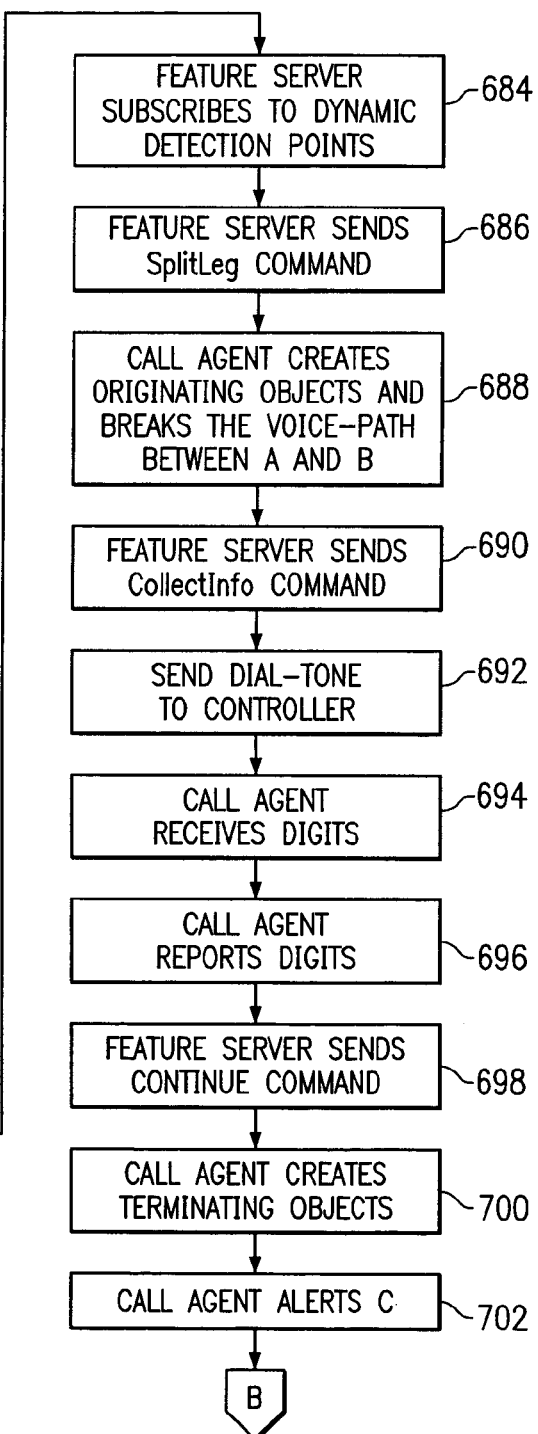
FIG. 27A

PROVIDING FEATURES TO A SUBSCRIBER IN A TELECOMMUNICATIONS NETWORK

RELATED APPLICATIONS

This application claims benefit under 35 U.S.C. § 119(e) of U.S. Provisional Application Ser. No. 60/231,831, filed Sep. 6, 2000, entitled "OPTICALL."

This application is related to U.S. patent application Ser. No. 09/948, 288, entitled "PROCESSING A SUBSCRIBER CALL IN A TELECOMMUNICATIONS NETWORK,"; to U.S. patent application Ser. No. 09/948,220, entitled "DATA COMMUNICATION AMONG PROCESSES OF A NETWORK COMPONENT,"; to U.S. patent application Ser. No. 09/947,743, entitled "MANAGING PROCESSES OF A NETWORK COMPONENT,"; to U.S. patent application Ser. No. 09/948,420, entitled "COMMUNICATING MESSAGES IN A MULTIPLE COMMUNICATION PROTOCOL NETWORK,"; to U.S. patent application Ser. No. 09/948,216, entitled "DATA REPLICATION FOR REDUNDANT NETWORK COMPONENTS,"; to U.S. patent application Ser. No. 09/948,316, entitled "RECORDING TRACE MESSAGES OF PROCESSES OF A NETWORK COMPONENT,"; to U.S. patent application Ser. No. 09/948, 474, entitled "MANAGING REDUNDANT NETWORK COMPONENTS,"; to U.S. patent application Ser. No. 09/948,318, entitled "MEDIA GATEWAY ADAPTER,"; and to U.S. patent application Ser. No. 09/948,315, entitled "SOFTWARE UPGRADE OF REDUNDANT NETWORK COMPONENTS,", all filed concurrently with the present application.

TECHNICAL FIELD OF THE INVENTION

This invention relates in general to telecommunications networks, and more particularly to providing features to a subscriber in a telecommunications network.

BACKGROUND OF THE INVENTION

Telecommunications networks are used to provide voice and data communication to an increasing number of subscribers. Conventional telecommunications architectures rely on switched circuit pathways. Newer architectures rely on routing of voice and data packets. The newer architectures, however, may need to satisfy a number of needs. For example, the voice and data communication may be based on a number of different communication protocols, which a telecommunications network may need to accommodate. Additionally, telecommunications networks may be required to provide a variety of features to subscribers. Consequently, newer telecommunications architectures creates challenges and opportunities for telecommunications networks.

SUMMARY OF THE INVENTION

In accordance with the present invention, the disadvantages and problems associated with telecommunications networks have been substantially reduced or eliminated.

In accordance with one embodiment of the present invention, a method for providing a feature in a telecommunications network is disclosed. Signals representing a call are received at a call agent to generate a detection point. The call is associated with a service identifier corresponding to a set of features. A feature server is identified from a number of feature servers. The identified feature server is notified of the detection point. The signals are processed in response to the detection point to provide a feature from the set of features.

Examples of the present invention may include none, some, or all of the following technical advantages. A technical advantage of one example is a feature server. The feature server stores programs that provide a number of features, which may allow for flexibility in adding features. In one example, a feature server may provide different features or feature sets to different subscribers. The feature server may allow a subscriber to select features or feature sets from different service providers. In another example, a feature server may also provide uninterrupted basic call processing during an upgrade or addition of another feature server.

Other technical advantages are readily apparent to one skilled in the art from the following figures, descriptions, and claims.

BRIEF DESCRIPTION OF THE DRAWINGS

For a more complete understanding of the present invention and its advantages, reference is now made to the following description, taken in conjunction with the accompanying drawings, in which:

FIG. 4 is a flowchart illustrating one example of a method for managing processes using the process manager of FIG. 3;

FIG. 5 is a block diagram of one example of a data communication system for communicating data among processes of a network component;

FIG. 7 is a flowchart illustrating one example of a method for communicating data among processes of a network component of FIG. 5;

FIG. 15 is a flowchart illustrating one example of a method for upgrading software on the redundant network components of FIG. 13;

FIGS. 16A through 16D illustrate examples of data tables from a series of data versions;

FIG. 18 is a flowchart illustrating one example of a method for recording trace messages from process threads of processes using the trace message system of FIG. 17;

FIG. 21 is a flowchart illustrating one example of a method for communicating messages in a multiple communication protocol network using the multiple communication protocol system of FIG. 19;

FIG. 22 is a block diagram illustrating one example of a media gateway adapter;

FIG. 24 is a block diagram illustrating one example of a feature server that provides features to subscribers;

FIGS. 25A and 25B are half call model representations illustrating examples of a call agent and a feature server providing a call waiting feature;

DETAILED DESCRIPTION OF THE INVENTION

Figure 1:
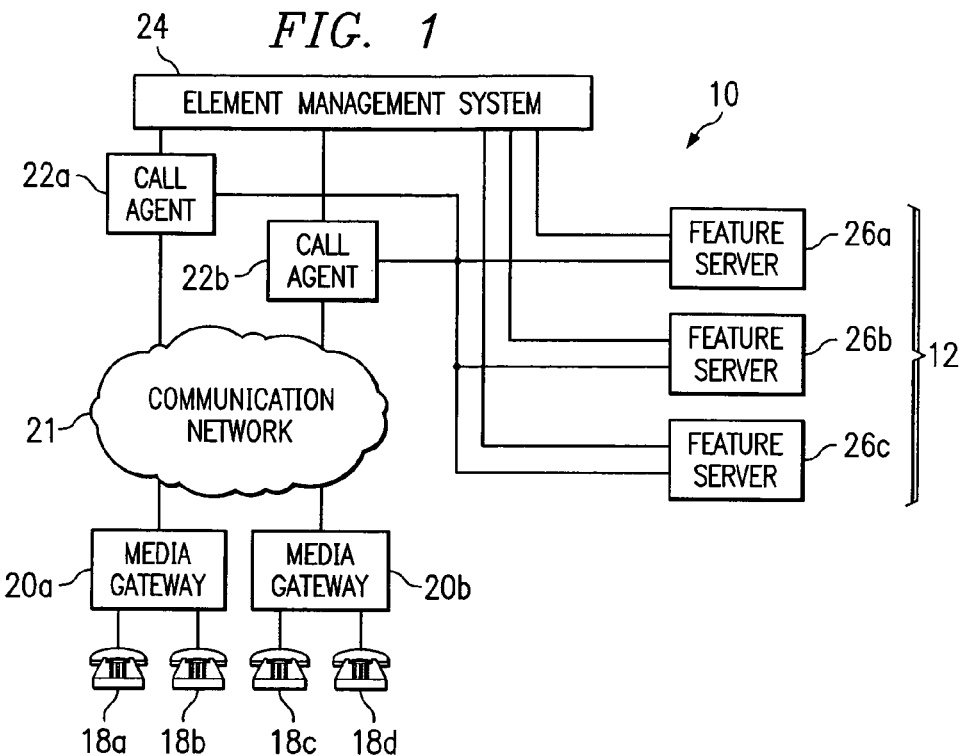
FIG. 1 is a block diagram illustrating one example of a system for processing calls in a telecommunications network.

FIG. 1 is a block diagram illustrating one example of a system 10 for processing calls in a telecommunications network. System 10 may comprise, for example, a portion of a telecommunications network that includes, for example, a public switched telephone network (PSTN), an Internet Protocol (IP) network, and/or an asynchronous transfer mode (ATM) network. System 10 may provide Class 4 and Class 5 features to calls handling voice traffic over packet networks, which may allow a service provider to provide these features without a conventional Class 4 or Class 5 public switch.

Referring to FIG. 1, system 10 includes telecommunications devices 18 coupled to media gateways 20, which are coupled to call agent 22a and 22b through a communication network 21. Call agents 22a and 22b are coupled to an element management system 24 and any number of feature servers 26. Media gateways 20, call agents 22a and 22b, element management system 24, and feature servers 26 may communicate with each other using signaling messages based on any suitable communication protocol, for example, an Internet Protocol such as Session Initiation Protocol (SIP).

Telecommunications devices 18 may include, for example, any type of phone or any other device suitable for communicating with media gateway 20 such as a computer, personal digital assistant, or facsimile machine. Telecommunications device 18 may have a terminal identifier that serves to identify telecommunications device 18. A subscriber may use telecommunications device 18 to access services provided by system 10. A subscriber may be identified by and associated with a subscriber identifier, for example, a telephone number or terminal identifier of telecommunications device 18, or other suitable identifier.

Telecommunications device 18 may have a point of presence. A point of presence may comprise a long distance carrier office of a local access and transport area, where long distance lines are connected to local lines.

Media gateways 20 provide an interface between telecommunications devices 18 and the rest of system 10. Media gateways 20 may perform switching services and protocol conversion between telecommunications devices 18 and communication network 21. Media gateways 20 may include, for example, a voice over IP gateway, a voice over asynchronous transfer mode gateway, a modem bank, or any other suitable device that provides an interface between telecommunications devices 18 and communication network 21. Media gateway 20 may comprise, for example, a CISCO MGX 8260 media gateway.

Communication network 21 may comprise a public switch telephone network, a public or private data network, the Internet, a wired or wireless network, a local, regional, or global communications network, other suitable communication links, or any combination of the preceding.

Call agent 22 may comprise hardware, software, or any combination of hardware and software that provides an interface between system 10 and the rest of a telecommunications network. Call agent 22 may manage call signaling conversion between system 10 and the rest of the telecommunications network, and may also take part in the switching and routing of calls across the telecommunications network. Call agent 22 may receive signals comprising signaling events comprising a call, maintain the state of the call, determine detection points of the call, process the call in response to the detection points, and report the detection points to, for example, feature server 26.

In general, a call proceeds through various detection points that may be detected by call agent 22. Call agent 22 may process the call or may report the detection points to other network components 12 that may send instructions to process the call. For example, a detection point for a call waiting feature may include a busy detection point, which may be reported to feature server 26 in order to trigger the call waiting feature.

A "static" detection point may routinely be reported to network component 12, and a "dynamic" detection point may be reported to network component 12 only if network component 12 indicates affirmatively to call agent 22 that network component 12 needs to be informed of that event by "subscribing" to the detection point. Call agent 22 may comprise, for example, a CISCO VSC 3000 media gateway controller or a CISCO SC 2200 media gateway controller.

Element management system 24 allows an administrative user to manage system 10. Element management system 24 may be used to, for example, configure, monitor, and operate network components 12 of system 10. Element management system 24 may comprise, for example, a CISCO 8100 element management system or a CISCO 6700 element management system. Feature server 26 provides features to subscribers, and is described in more detail in connection with FIGS. 24 through 29.

A shared memory 51 stores representations of calls and instructions for processing calls. A half call model representation is described in connection with FIGS. 25A and 25B. A network component 12 may access shared memory 51 to determine a state of a call and to obtain instructions for processing the call.

An example of system 10 may include a network component 12 that has a platform, which is described in connection with FIGS. 2 through 4. The platform may provide generic operations for any of a number of different network components 12, which may allow for more efficient design and production of network components 12.

Another example of system 10 may allow processes of a network component 12 to communicate with each other using shared memory 51, which is described in connection with FIGS. 5 through 7. One process may write data to shared memory 51, and another process may read the data from shared memory 51, which allows for efficient communication between processes.

Another example of system 10 may include redundant network components 12, which are described in connection with FIGS. 8 through 16. Redundant network components 12 may have any of a number of configurations and may be placed in any of a number of locations, which may provide for a flexible redundant system. A redundant network component 12 may use a replication table to track data replicated to a mate network component 12, which may allow for reliable data replication. Redundant network components 12 may be upgraded while one of the network components 12 is processing a stable call, which may allow for a faster upgrade of system 10.

Figure 17:
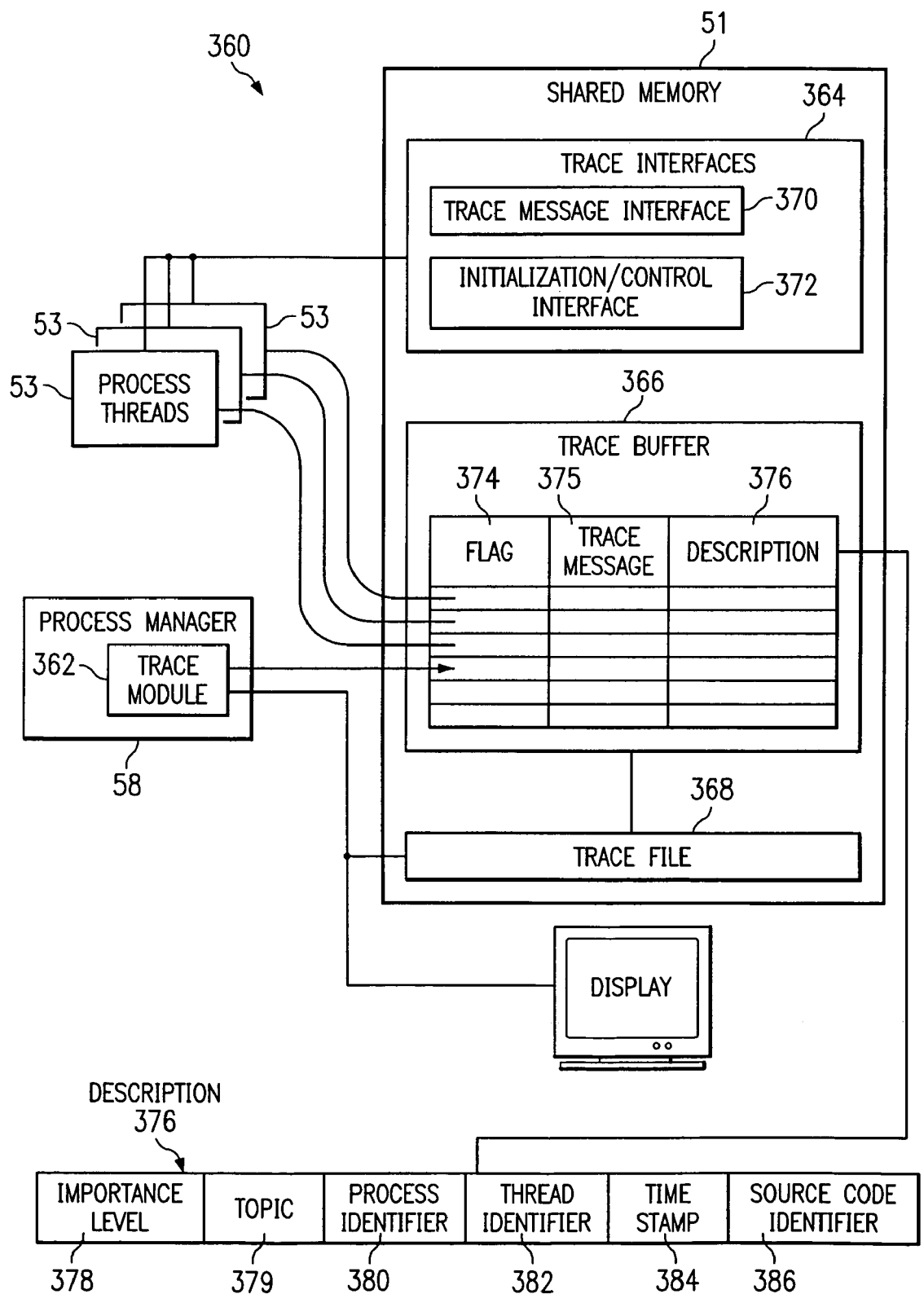
FIG. 17 is a block diagram illustrating one example of a trace message system for recording trace messages from process threads of processes.

Another example of system 10 may include a trace buffer, which is described in FIGS. 17 and 18, of shared memory 51 that records trace messages of the processes of network components 12. The trace buffer may allow for a more efficient manner of tracking process in system 10.

Another example of system 10 may include network components 12 that have a signaling adapter interface, which is described in connection with FIGS. 19 through 21. The signaling adapter interface may process messages communicated according to a number of communication protocols, which may provide for a flexible system 10.

Another example of system 10 may include network components 12 that use media gateway adapters, which are described in connection with FIGS. 22 and 23, to process messages between call agents 22 and media gateways 20. Media gateway adapters may use distributed processing, which allows for more efficient processor utilization.

Another example of system 10 may include feature servers 26, which are described in connection with FIGS. 24 through 29. Feature servers 26 may provide Class 5/4 features that typically require a public switch, which allows for a more flexible system 10.

Network Component Platform

Figure 2:
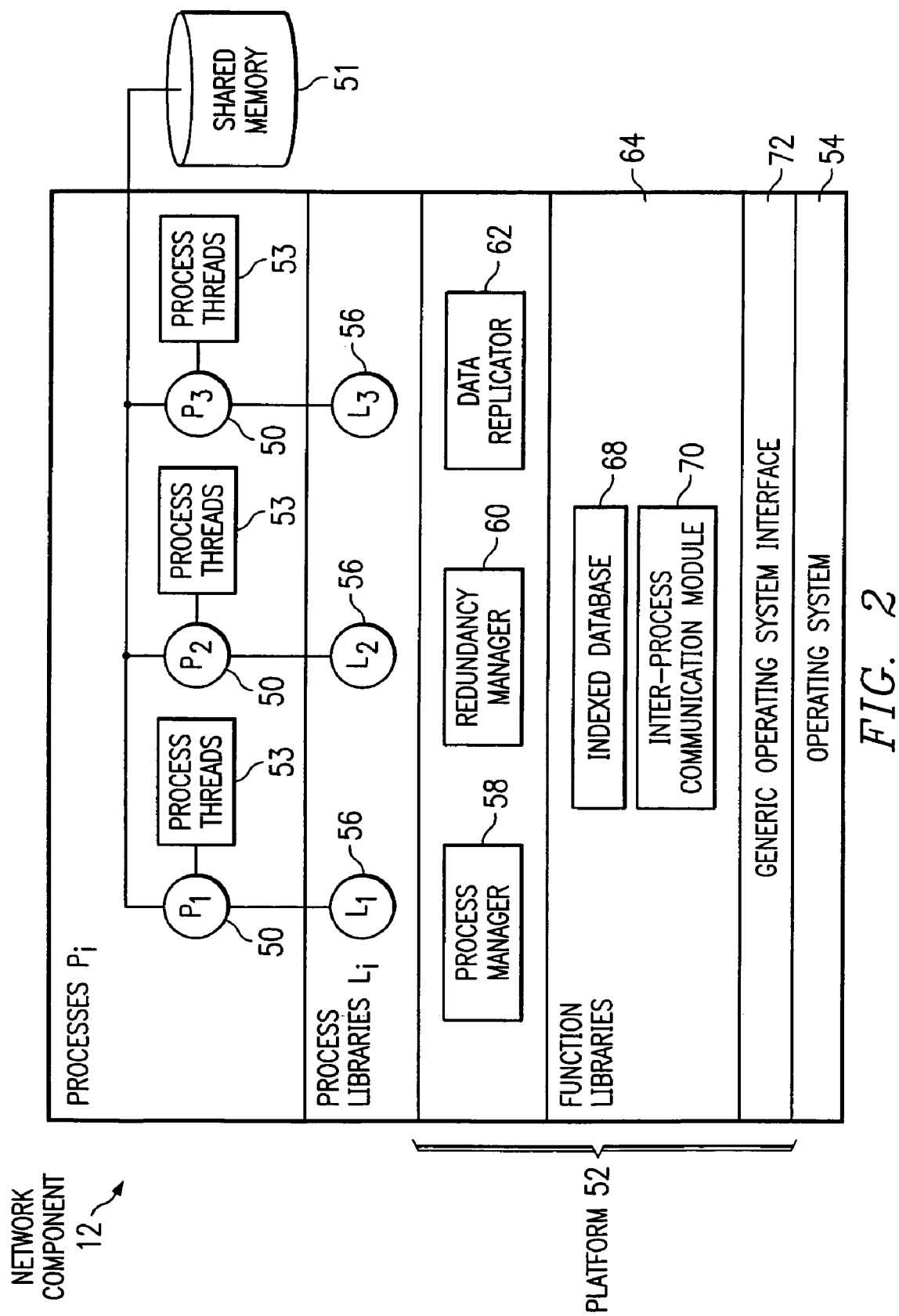
FIG. 2 is a block diagram illustrating one example of a network component of FIG. 1 that includes a platform.

FIG. 2 is a block diagram illustrating one example of network component 12 of FIG. 1 that includes a platform 52. Platform 52 may comprise a group of software systems that can perform generic operations for any of a number of different network components 12.

Network component 12 includes one or more processes 50, a shared memory 51, platform 52, and an operating system 54. Processes 50 may comprise any number of software applications that perform the operations of network component 12. A process 50 may access a designated process library 56 or a process library 56 for another process 50. A process library 56 stores software code that may be used to perform the operations. A process 50 may use one or more process threads 53 to provide concurrent processing.

Shared memory 51 may store data utilized by any number of processes 50, and may be used to share information among processes 50. A source process $P_1$ may communicate with a target process $P_2$ by writing data to shared memory 51. Target process $P_2$ may access shared memory 51 to read the data. Additionally, a process thread 53 of process 50 may communicate with another process thread 53 of process 50 by writing data to shared memory 51. The other process thread 53 may access shared memory 51 to read the data. Communicating data among processes 50 is described in more detail in connection with FIGS. 5 through 7.

Platform 52 includes a process manager 58, a redundancy manager 60, and a data replicator 62. Process manager 58 starts, monitors, and restarts processes 50, and may also create shared memory 51. Process manager 58 is described in more detail in connection with FIGS. 3 and 4. Process manager 58 may also transfer trace messages from shared memory 51 to a non-volatile storage medium such as a disk file, which is described in more detail in connection with FIGS. 17 and 18.

Redundancy manager 60 monitors network component 12 and a mate network component 12, either of which may be in an active state or a standby state. Redundancy manager 60 manages switching the state of network component 12. For example, redundancy manager 60 may switch network component 12 to an active state if mate network component 12 is faulty. Redundancy manager 60 is described in more detail in connection with FIGS. 8 through 12. Redundancy manager 60 also manages the operation of data replicator 62. Data replicator 62 replicates data from an active network component 12 to a standby network component 12. Data replicator 62 is described in more detail in connection with FIGS. 13 and 14. Redundancy manager 60 and data replicator 62 may also be used to upgrade software on network components 12, as described in more detail in connection with FIGS. 15 and 16.

Function libraries 64 may provide common software functionality to processes 50, including process manager 58. Indexed database library 68 may be used to create shared memory 51. Inter-process communication module 70 may be used to communicate data among processes 50 using shared memory 51. A generic operating system interface 72 may be used to provide a common interface between processes 50 and libraries 64 of network component 12 and operating system 54. Operating system 54 may comprise any suitable system such as SUN MICROSYSTEMS OPERATING SYSTEM.

Figure 3:
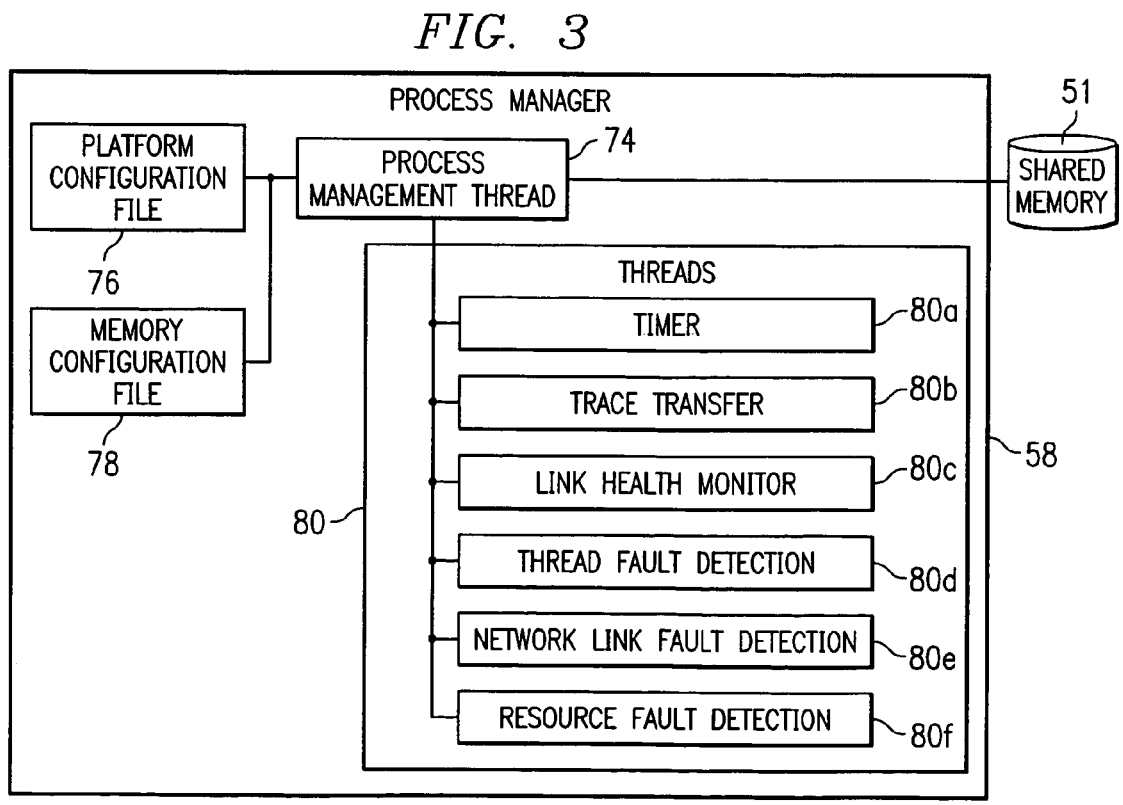
FIG. 3 is a block diagram illustrating one example of a process manager of FIG. 2.

FIG. 3 is a block diagram illustrating one example of process manager 58 of FIG. 2. Process manager 58 may include a process management thread 74, a platform configuration file 76, a memory configuration file 78, and threads 80. Process management thread 74 starts, restarts, and manages processes 50, and may also create shared memory 51. Platform configuration file 76 includes system configuration information for network component 12 such as a primary Internet Protocol (IP) address, a secondary IP address, a primary user datagram protocol (UDP) port number, and a secondary UDP port number. Platform configuration file 76 may also include specific information about processes 50 such as command line arguments and executable file names for a process 50. Process management thread 74 may use platform configuration file 76 to start processes 50.

Memory configuration file 78 includes data that is global to processes 50 such as system information, process information, provisioning data, and call-related data. Memory configuration file 78 may also store shared memory configuration information. Process management thread 74 may use memory configuration file 78 to configure shared memory 51.

Threads 80 include timer thread 80*a*, a trace transfer thread 80*b*, a link health monitor thread 80*c*, a thread fault detection thread 80*d*, a network link fault detection thread 80*e*, and a resource fault detection thread 80*f*. Timer thread 80*a* stores the current system time in shared memory 51, which is accessible to processes 50. Trace transfer thread 80*b* transfers trace messages from shared memory 51 to a non-volatile storage medium, link health monitor thread 80*c* monitors the health of communication links, thread fault detection thread 80*d* detects thread faults, network link fault detection thread 80*e* detects network link faults, and resource fault detection thread 80*f* detects resource faults.

FIG. 4 is a flowchart illustrating one example of a method for managing processes 50 using process manager 58 of FIG. 3. The method begins at step 86, where process manager 58 initializes processes 50 at network component 12. Processes 50 are monitored at step 87. Process manager 58 may detect that a process 50 has died, or has ceased to perform, at step 88. If process manager 58 does not detect a dead process 50 at step 88, the method returns to step 87, where processes 50 are monitored.

If process manager 58 detects a dead process 50 at step 88, the method proceeds to step 89, where process manager 58 determines whether dead process 50 is restartable. If dead process 50 is restartable, the method proceeds to step 90, where process manager 58 determines whether a maximum allowable restart rate for dead process 50 has been exceeded. The maximum allowable restart rate, which may be stored in platform configuration file 76, may be specified as n/m, where n is the maximum allowed restarts per m hours. If the maximum has not been exceeded, the method proceeds to step 91, where process manager 58 restarts process 50. The method then returns to step 87.

If dead process 50 is not restartable at step 89, or if the maximum allowed restart rate has been exceeded at step 90, the method proceeds to step 92. Network component 12 may be operating in a simplex or duplex mode at step 92. In duplex mode, network component 12 has a mate network component 12. The mate network component 12 may, for example, operate in a standby mode while network component 12 operates in an active mode. In simplex mode, network component 12 operates without a mate network component 12.

If network component 12 is operating in a duplex mode at step 92, the method proceeds to step 93, where process manager 58 determines whether to perform a switchover that will allow mate network component 12 to take over the operations of network component 12. Platform configuration file 76 may store information on whether a switchover is to be performed. If a switchover is not to be performed, the method returns to step 87 such that network component 12 continues to operate without the dead process 50. If a switchover is to be performed, the method proceeds to step 94, where process manager 58 performs the switchover to allow mate network component 12 to take over the operations of network component 12.

If network component 12 is operating in a simplex mode at step 92, the method proceeds to step 95, where process manager 58 determines whether to continue the operations of network component 12 without process 50 or to bring down network component 12. Platform configuration file 76 may provide information on whether to continue. If the operations of network component 12 are to be continued, the method returns to step 87. If the operations of network component 12 are not to be continued, the method proceeds to step 96. At step 96, platform 52 ends processes 50 of network component 12. After ending processes 50, the method terminates.

In one example, network component 12 may include platform 52. Platform 52 allows for efficient design and production of network components 12 by providing generic operations for any of a number of different network components 12. Platform 52 may also access shared memory 51 in order to process calls, which provides for efficient call processing. Thus, platform 52 may allow for practical production and operation of system 10 that stores representations of calls in shared memory 51.

Data Communication Among Processes

FIG. 5 is a block diagram of one example a data communication system 100 for communicating data among processes 50 of network component 12. All or portions of data communication system 100 may be stored in, for example, shared memory 51. To communicate data from a source process 50 to a target process 50, source process 50 writes data to data communication system 100, and target process 50 reads the data from data communication system 100. Source process 50 may be the same as or different from target process 50.

Data communication system 100 may comprise a shared memory 102, a heap memory 104, a number of memory queues 110, and an application programming interface (API) library 106. Shared memory 102 may be accessed by any number of processes 50, and may be used to communicate data between two different processes 50. Shared memory 102 may include message buffer pools 108. A message buffer pool 108 includes message buffers 112 and a free message queue 114. Message buffer pools 108 may include message buffers 112 of a specific size. For example, message buffer pool 108*a* may include message buffers 112 of one size, while message buffer pool 108*b* may include message buffers 112 of another size.

Message buffers 112 store data that is to be communicated from a source process 50 to a target process 50. A message buffer 112 may include a header 116 and a data block 118. Header 116 provides the location of data block 118, which may be used to store data. Free message queue 114 maintains a list of available message buffers 112 and provides a message buffer 112 in response to a request by inter-process communication module 70.

Heap memory 104 includes process heap memories 109. A process heap memory 109 may be accessible by only a specific process 50, and may be used to communicate data among different process threads 53 of the process 50. Process heap memory 109 includes message buffers 111 that may store data that is to be communicated from one process thread 53 to another process thread 53 of a process 50.

Message queues 110 are used to provide data to a target process 50, and may be designated to provide data to a specific process 50. A message queue 110 may include a shared memory queue 120 and a heap memory queue 122. Shared memory queue 120 provides data stored in shared memory 102, and heap memory queue 120 provides data stored in heap memory 104.

API library 106 provides an interface between data communication system 100 and network component 12 to allow platform 52 to manage message buffer pools 108, message buffers 111 and 112, and message queues 110. For example, API library 106 may allow platform 52 to create message buffer pools 108 and initialize message queues 110.

Figure 6:
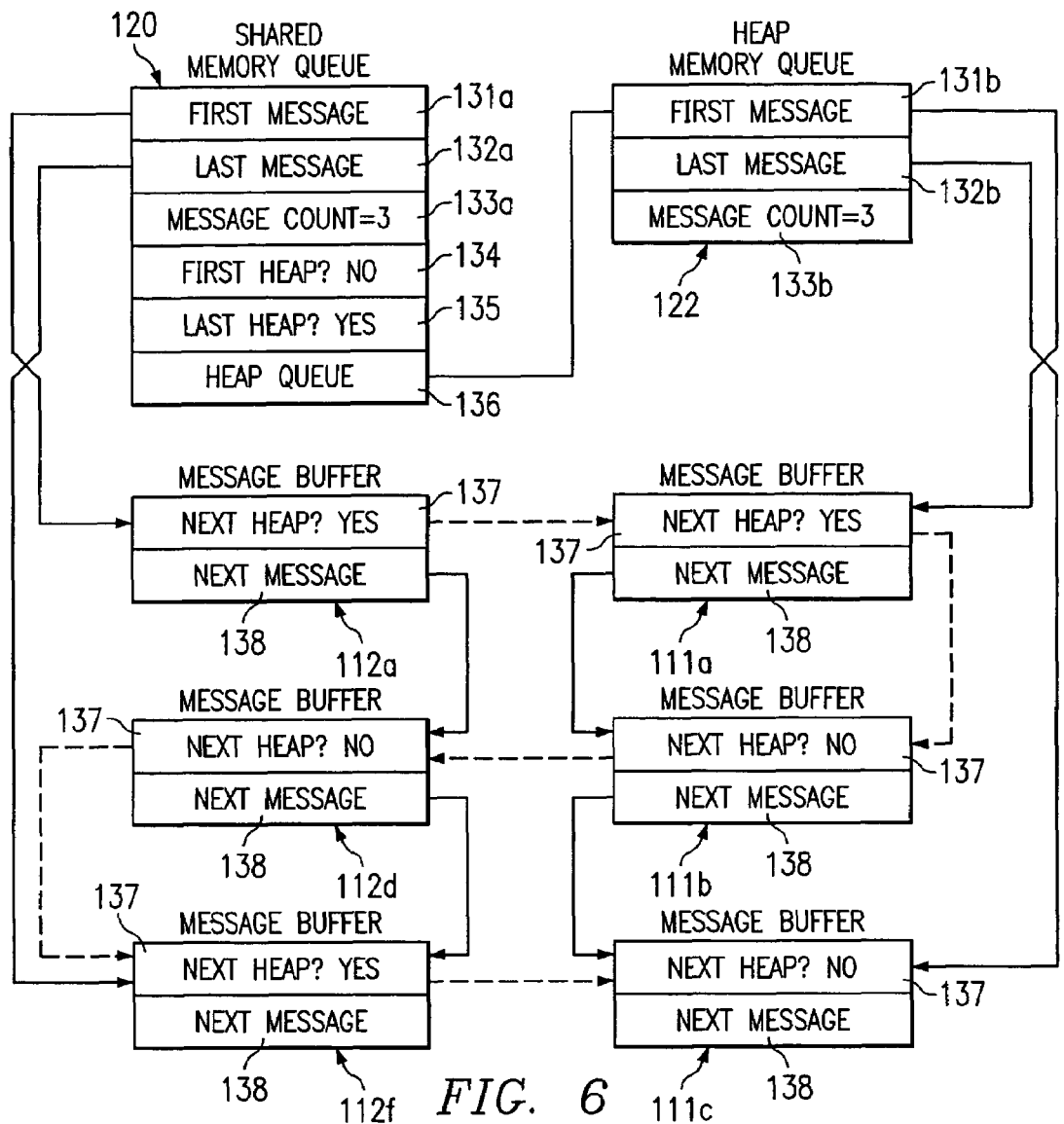
FIG. 6 is a block diagram illustrating examples of a shared memory queue and a heap memory queue of a message queue of FIG. 5.

FIG. 6 is a block diagram illustrating examples of shared memory queue 120 and heap memory queue 122 of message queue 110 of FIG. 5. Message queue 110 may be designated to provide data to a specific process 50. Message queue 110 receives a sequence of pointers to message buffers 111 and 112 that store data. The pointers to message buffers 111 are stored in heap memory queue 122, and the pointers to message buffers 112 are stored in shared memory queue 120. Shared memory queue 120 and heap memory queue 122 include fields that record the sequence of pointers.

Shared memory queue 120 includes a number of fields 131 through 136. A first message field 131a includes a pointer to the first message buffer 112a of shared memory queue 120. A last message field 132a includes a pointer to the last message buffer 112f of shared memory queue 120. A message count field 133a includes the total number of message buffers 112a, 112d, and 112f of shared memory queue 120. A first heap field 134 indicates whether the first message buffer of the sequence received by message queue 110 is in heap memory queue 122. In the illustrated example, the first message buffer 112a is not in heap memory queue 122. A last heap field 135 indicates whether the last message buffer of the sequence is in heap memory queue 122. In the illustrated example, the last message buffer 111c is in heap memory queue 122. Heap queue field 136 includes a pointer to heap memory queue 122.

Heap memory queue 122 includes a number of fields 131b through 133b. A first message field 131b includes a pointer to the first message buffer 111a of heap memory queue 122. A last message field 132b includes a pointer to the last message buffer 111c of heap memory queue 122. A message count field 133b specifies the total number of message buffers 111a, 111b, and 111c of heap memory queue 122.

Each message buffer 111 and 112 includes a next heap field 137 and next message field 138. Next heap field 137 indicates whether the next message buffer is in heap memory queue 122. In the illustrated example, next heap field 137 of message buffer 112a indicates that the next message buffer is in heap memory queue 122. Next message field 138 includes a pointer to the next message buffer of either shared memory queue 120 or heap memory queue 122.

In the illustrated example, the sequence of message buffers 111 and 112 is 112a, 111a, 111b, 112d, 112f, and 111c, as indicated by the fields of message queue 110. First heap field 134 indicates that the first message buffer is in shared memory queue 120. First message field 131a points to message buffer 112a as the first message buffer of shared memory queue 120. Next heap field 137 of message buffer 112a indicates that the next message buffer is in heap memory queue 122.

First message buffer 131b points to message buffer 111a as the first message buffer of heap memory queue 122. Next heap field 137 of message buffer 111a indicates that the next message buffer is in heap memory queue 122. Next message field 138 points to message buffer 111b as the next message buffer of heap memory queue 122. Next heap field 137 of message buffer 111b indicates that the next message buffer is in shared memory queue 120. The next message buffer of shared memory queue 120 is message buffer 112d, as indicated by next message buffer 138 of message buffer 112a.

Next heap field 137 of message buffer 112d indicates that the next message buffer is in shared memory queue 120. Next message field 138 points to message buffer 112f as the next message buffer of shared memory queue 120. Next heap field 137 of message buffer 112f indicates that the next message buffer is in heap memory queue 122. Message buffer 111c is the next message buffer of heap memory queue 122, as indicated by next message buffer 138 of message buffer 111b. Message buffer 111c is also the last message of heap memory queue 122, as indicated by a last message field 122b, and the last message buffer of the sequence, as indicated by last heap field 135 of shared memory queue 120.

FIG. 7 is a flowchart illustrating one example of a method for communicating data among processes 50 of network component 12 of FIG. 5. According to the method, a source process 50 stores data in a message buffer 111 or 112, and then a target process 50 reads the stored data.

The method begins at step 150, where inter-process communication module 70 creates message buffers 111 and 112 and message queues 110. The creation may be initiated by a request from platform 52. The request may specify the number of message buffer pools 108 to be created and the size of message buffers 112 to be included in message buffer pools 108. For each message buffer pool 108, one portion may be created to include headers 116 and another portion may be created to include data blocks 118. A linked list may be created from the message buffers 112.

At step 152, inter-process communication module 70 receives an allocation request from a source process 50 for a message buffer to communicate data to a target process 50. Message buffer may be in either shared memory 102 or heap memory 104 at step 153. If target process 50 is different from source process 50, the allocation request may request a message buffer 112 from shared memory 102, which may be accessed by both source process 50 and target process 50. If target process 50 is the same as source process 50, the allocation request may request a message buffer 111 from a process heap memory 109 that is accessible by only the source/target process 50.

If the request is for message buffer 112 of shared memory 102, the method proceeds to step 154. The allocation request may include a request for a message buffer 112 of a specific message buffer size. At step 154, inter-process communication module 70 selects a message buffer pool 108 that includes message buffers 112 of a sufficient size. If there are no message buffers 112 of a sufficient size, the method terminates.

If there is a message buffer 112 of a sufficient size, the method proceeds to step 156, where inter-process communication module 70 allocates message buffer 112. To allocate message buffer 112, inter-process communication module 70 may retrieve header 116 of message buffer 12, and set a pointer of header 116 to point to data block 118. A source address of header 116 may be set to the address of source process 50, and data block 118 may be initialized. During allocation, free message queue 114 may be locked in order to prevent other processes 50 from accessing free message queue 114 and obtaining message buffer 112. Data communicated by source process 50 is stored in data block 118 at step 158.

If at step 153 the allocation requests a message buffer 111 from heap memory 104, the method proceeds to step 162, where inter-process communication module 70 allocates a portion of process heap memory 109 for message buffer 111. Message buffer 111 is initialized, and a source address of message buffer 111 may be set to the address of source process 50. Data communicated by source process 50 is stored in message buffer 111 at step 164.

At step 166, inter-process communication module 70 receives a dispatch request to deliver message buffer 111 or 112 to target process 50. Inter-process communication module 70 may check message buffer 111 or 112 to determine whether message buffer 111 or 112 is included in shared memory 102 or heap memory 104. The validity and the availability of target process 50 may also be verified.

Message queue 110 associated with target process 50 is retrieved at step 168. The most recently and the least recently arrived message buffers 111 and 112 of message queue 110 may be retrieved in order to determine the head and tail of message queue 110. During the dispatch process, message queue 110 may be locked. A source address of message buffer 111 or 112 may be set to the address of source process 50, and the destination address may be set to the address of target process 50.

If message buffer 112 is in shared memory 102, the method proceeds to step 172, where inter-process communication module 70 inserts message buffer 112 into shared memory queue 120. If message buffer 111 is in heap memory 104, inter-process communication module 70 inserts message buffer 111 into heap memory queue 122 at step 174.

At step 176, target process 50 is notified to check message queue 110 associated with target process 50. Inter-process communication module 70 receives a retrieval request from target process 50 at step 178. Message queue 110 associated with target process 50 is retrieved at step 180. A signal may indicate whether there is a message buffer 111 or 112 located in message queue 110.

If message buffer 112 is in shared memory 102, the method proceeds to step 182, where message queue 110 provides header 116 and data block 118 to the target process 50. Target process 50 may read the data stored in data block 118. If message buffer 111 is in heap memory 104, the method proceeds to step 184, where inter-process communication module 70 provides the header of message buffer 111 to target process 50. Target process 50 may read the data stored in message buffer 111.

At step 186, message buffer 111 or 112 is freed to be made available for other processes 50. If message buffer 112 is in shared memory 102, inter-process communication module 70 includes a pointer to message buffer 112 in free message queue 114 to free message buffer 112. If message buffer 111 is in heap memory 104, process control module 70 deletes data in message buffer 111 to free message buffer 111. After freeing message buffer 111 or 112, the method terminates.

Processes 50 of network component 12 may communicate with each other using shared memory 51 that stores representations of calls. Shared memory 51 provides for efficient communication between processes 50 by allowing one process 50 to write data to shared memory 51, and another process to read the data from shared memory 51.

Process communication typically involves copying a message from a source process to a target process. The use of shared memory 51, however, does not require copying of a message between two processes. Additionally, process communication typically involves using kernel resources such as sockets or pipes. The use of shared memory 51, however, does not require kernel involvement. Avoiding copying and kernel involvement may improve the efficiency of process communication. Thus, shared memory 51 allows for efficient data communication in system 10 that stores representations of calls in shared memory 51.

Redundant Network Components

Figure 8:
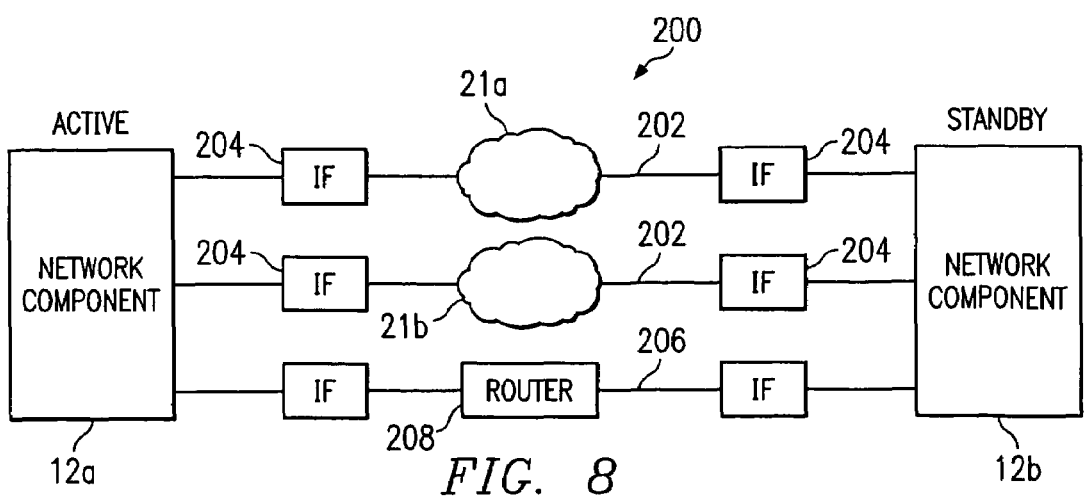
FIG. 8 is a block diagram illustrating one example of a communications system having redundant network components coupled by one or more communication networks.

FIG. 8 is a block diagram illustrating one example of a communications system 200 having redundant network components 12 coupled by one or more communication networks 21. Network components 12 are mate network components for each other. Network components 12a and 12b may be substantially similar to each other, and may be operable to perform similar functions. In the illustrated example, network component 12a operates in an active mode, and network component 12b operates in a standby mode. Active network component 12a performs the operations of communications system 200. For example, network component 12 may comprise media gateways, feature servers, call agents, or other portions of an integrated telecommunication system. In the event that network component 12a is not operating in an active mode, network component 12b may switch from a standby mode to an active mode in order to perform the operations of communications system 200.

Network components 12 may communicate with each other using any number of communication links 202 comprising any number of communication networks 21 and any number of interfaces 204. Multiple communication links 202 allows for backup communication links 202 if there is a failure of a communication link 202. Communication network 21 may comprise, for example, all or a portion of the Internet, and network components 12 may communicate using, for example, any suitable Internet protocol. Communication network 21a may be logically or physically separated from communication network 21b, such that failure of one communication network 21 does not affect the operation of the other communication network 21.

A communication link 206 may also be provided through a router 208. If standby network component 12b cannot use communication links 202 to detect whether network component 12a is operating in an active mode, standby network component 12b may use communication link 206 to detect the operation of network component 12a.

The ability of network components 12 to communicate with each other through communication networks 21 may allow network components 12 to be located in different locations. For example, network component 12a may be located in one city, and network component 12b may be located in another city. Network components 12, however, may also be at the same location.

Figure 9:
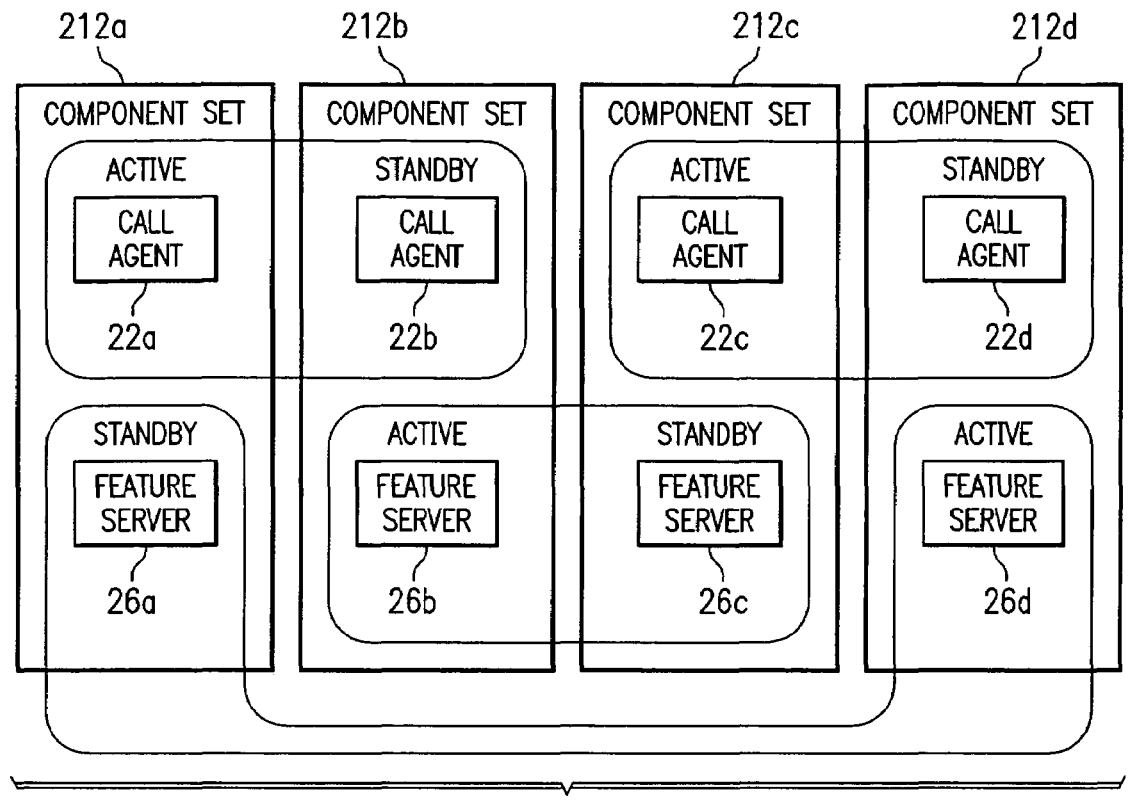
FIG. 9 is a block diagram illustrating example mate network components from different component sets forming a chain.

FIG. 9 is a block diagram illustrating example mate network components 12 from different component sets 212 forming a chain 214. A component set 212 may include any number of network components 12. For example, a component set 212 may include a call agent 22 and a feature server 26. Network components 12 of a component set 212 may be located at the same location, while each component set 212 may be located at different locations.

Mate network components 12 may be located in different component sets 212. For example, call agent 22a is located in component set 212a, while its mate call agent 22b is located in component set 212b. Mate network components may be organized in a chain 214. For example, feature server 26b is located in component set 212b, while its mate feature server 26c is located in component set 212c. Call agent 22c is located in component set 212c, while call agent 22d is located in component set 212d. Finally, feature server 26d is located in component set 212d, while its mate feature server 26a is located in component set 212a. Any number of component sets and any number of network components 12 may be included in chain 214.

Organizing mate network components 12 in a chain 214 may allow for continued operation of system 10 even in the event of the failure of a component set 212. For example, if component set 212a fails, standby call agent 22b of component set 212b and feature server 26d of component set 212d may continue to operate.

Figure 10:
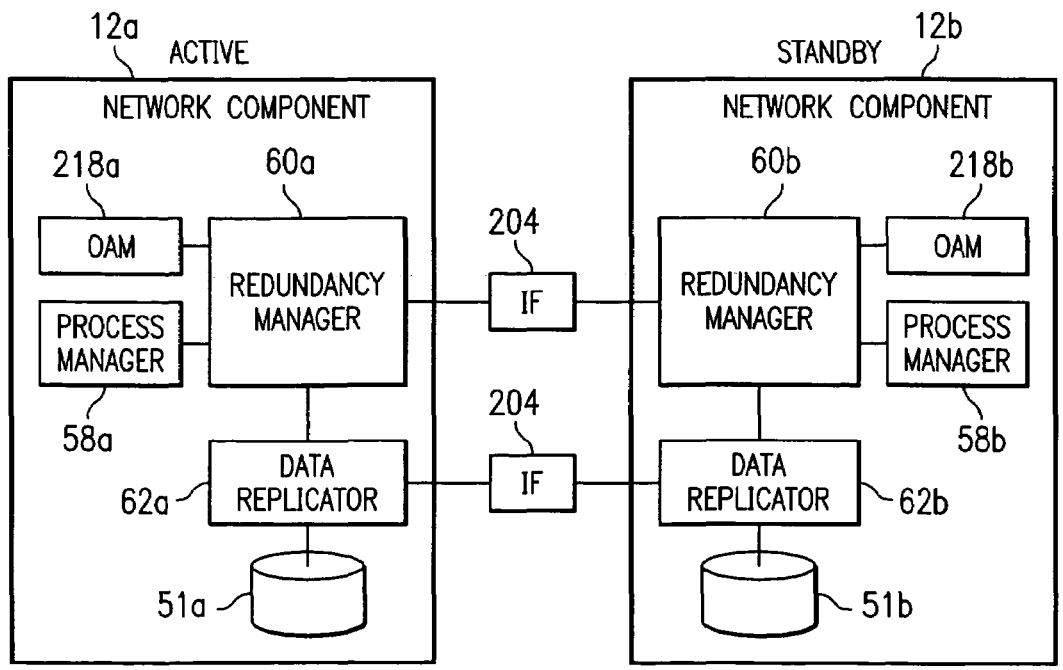
FIG. 10 is a block diagram illustrating example redundant network components of FIG. 8.

FIG. 10 is a block diagram illustrating example redundant network components 12 of FIG. 8. Network component 12 includes an operations, administration, and maintenance (OAM) module 218, process manager 58, redundancy manager 60, data replicator 62, and a shared memory 51. OAM module 218 may perform network management functions such as providing performance information. Process manager 58 manages the operation of redundancy manager 60.

Redundancy manager 60 of local network component 12 monitors the state of a mate network component 12, and may direct the operations of the local network component 12 in response to the state of the mate network component 12. For example, redundancy manager 60b of standby network component 12b may determine that mate network component 12a is no longer operating in an active mode. In response, redundancy manager 60 may change the state of network component 12b from a standby mode to an active mode.

Redundancy manager 60 may allow a user to force the states of network components 12. For example, a user may use redundancy manager 60 to force network component 12a to operate in an active mode and network component 12b to operate in a standby mode, or vice versa. A user may force both network components 12 to operate in a standby mode.

Redundancy manager 60 may monitor the mate network component 12 through interface 204, and may send an alarm if the communication link through interface 204 has failed. Redundancy manager 60 may also initiate fault isolation procedures if communication with its mate network component 12 is lost. Redundancy manager 60 may manage data replicator 62, which is described in more detail in connection with FIGS. 13 and 14. Data replicator 62 of a network component sends data to and receives data from mate network component 12. For example, data replicator 62a of active network component 12a may send data to standby network component 12b.

Figure 11:
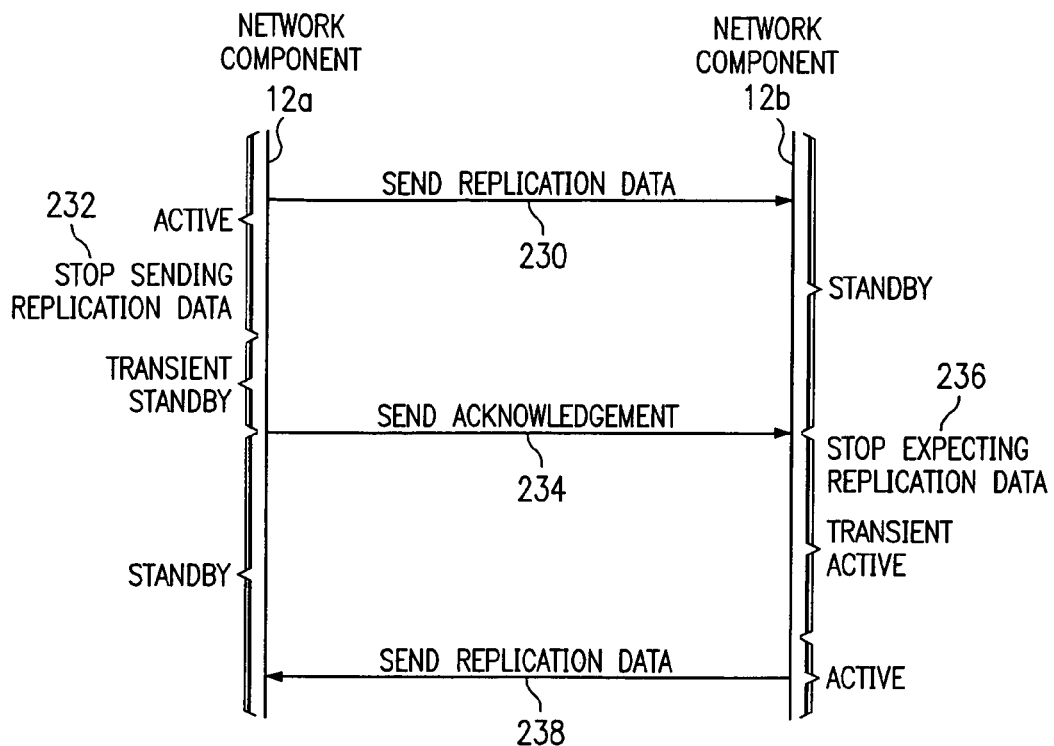
FIG. 11 is a diagram illustrating one example of a network component operating in an active mode switching to a standby mode, and a network component operating in a standby mode switching to an active mode.

FIG. 11 is a diagram illustrating one example of a network component 12a operating in an active mode switching to a standby mode, and a network component 12b operating in a standby mode switching to an active mode. Network component 12a may switch from an active mode to a standby mode, and network component 12b may switch from a standby mode to an active mode if, for example, network component 12a detects an internal fault or a defective process 50. A user may also force network components 12 to change their states. The switchover may occur in response to a command from either network component 12.

The method begins at step 230, where network component 12a is operating in an active mode, and mate network component 12b is operating in a standby mode. Data replicator 62a sends replication data to network component 12b. Data replicator 62a stops sending replication data at step 232, and network component 12a enters a transient standby mode.

At step 234, network component 12a sends an acknowledgement to network component 12b. Data replicator 62b stops expecting replication data at step 236, and enters a transient active mode. At step 238, network component 12b enters an active mode, and data replicator 62b sends replication data to network component 12a. By entering a transient active mode after network component 12a has entered a transient standby mode, network components 12b may avoid a "split-brain" situation with network component 12a, where mate network components 12 are simultaneously in active modes.

Figure 12:
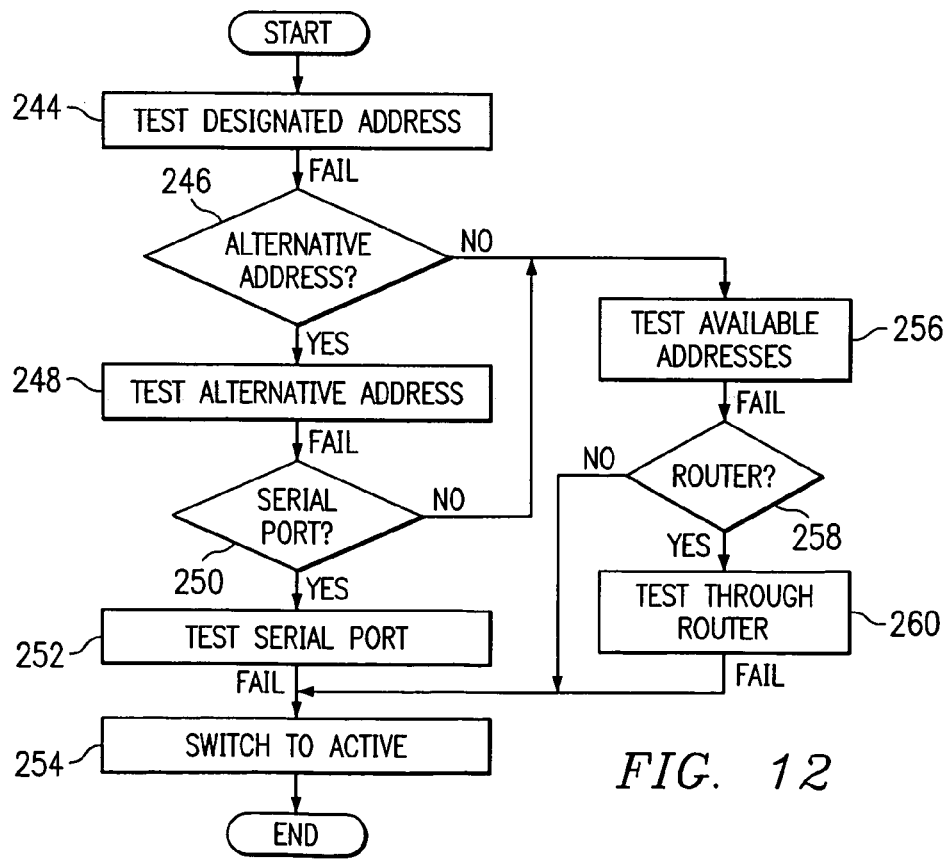
FIG. 12 is a flowchart illustrating one example of a method whereby a standby network component may determine whether an active network component is operating in an active mode.

FIG. 12 is a flowchart illustrating one example of a method whereby standby network component 12b may determine whether active network component 12a is operating in an active mode. The method provides a number of tests to determine the operating mode of a network component 12a. The tests may reduce the possibility of a split-brain situation. A split-brain situation may occur if, for example, standby network component 12b incorrectly determines that active network component 12a is faulty and switches to an active mode, resulting in two active network components 12.

The method begins at step 244, where redundancy manager 60b of standby network component 12b tests a designated address of network component 12a. Redundancy manager 60b may, for example, ping the designated address by periodically bouncing a signal off of the designated address. If the test fails, for example, there is no return signal, active network component 12a may be faulty or may be unreachable using the designated address. Other tests may be conducted to determine whether network component 12a is faulty or is merely unreachable using the designated address.

Network component 12a may have a designated alternative address at step 246. If there is an alternative address, the method proceeds to step 248 where the alternative address is tested. If the test fails, the method proceeds to step 250. Network component 12a may have a designated serial port at step 250. If network component 12a has a designated serial port, the method proceeds to step 252, where redundancy manager 60b tests the serial port. If the test fails, network component 12b switches from a standby mode to an active mode at step 254, and the method terminates.

If there is no designated alternative address at step 246, or if there is no designated serial port at step 250, the method proceeds to step 256, where redundancy manager 60b tests other available addresses of network component 12a. If the tests fail, the method proceeds to step 258. Network component 12a may be accessible through a router 208 at step 258. If there is a router 208, the method proceeds to step 260, where redundancy manager 60b tests network component 12a through router 208. If the test fails, the method proceeds to step 254, where network component 12b switches from a standby mode to an active mode. If there is no router at step 258, the method proceeds directly to step 254, where network component 12b switches from standby mode to active mode.

In one example, system 10 may include redundant network components 12. Redundant network components 12 use shared memory 51 to process calls, and thus may be arranged in any of a number of configurations in any of a number of locations. Thus, redundant network components 12 may provide system 10 with a flexible redundant system 10.

Data Replication

Figure 13A:
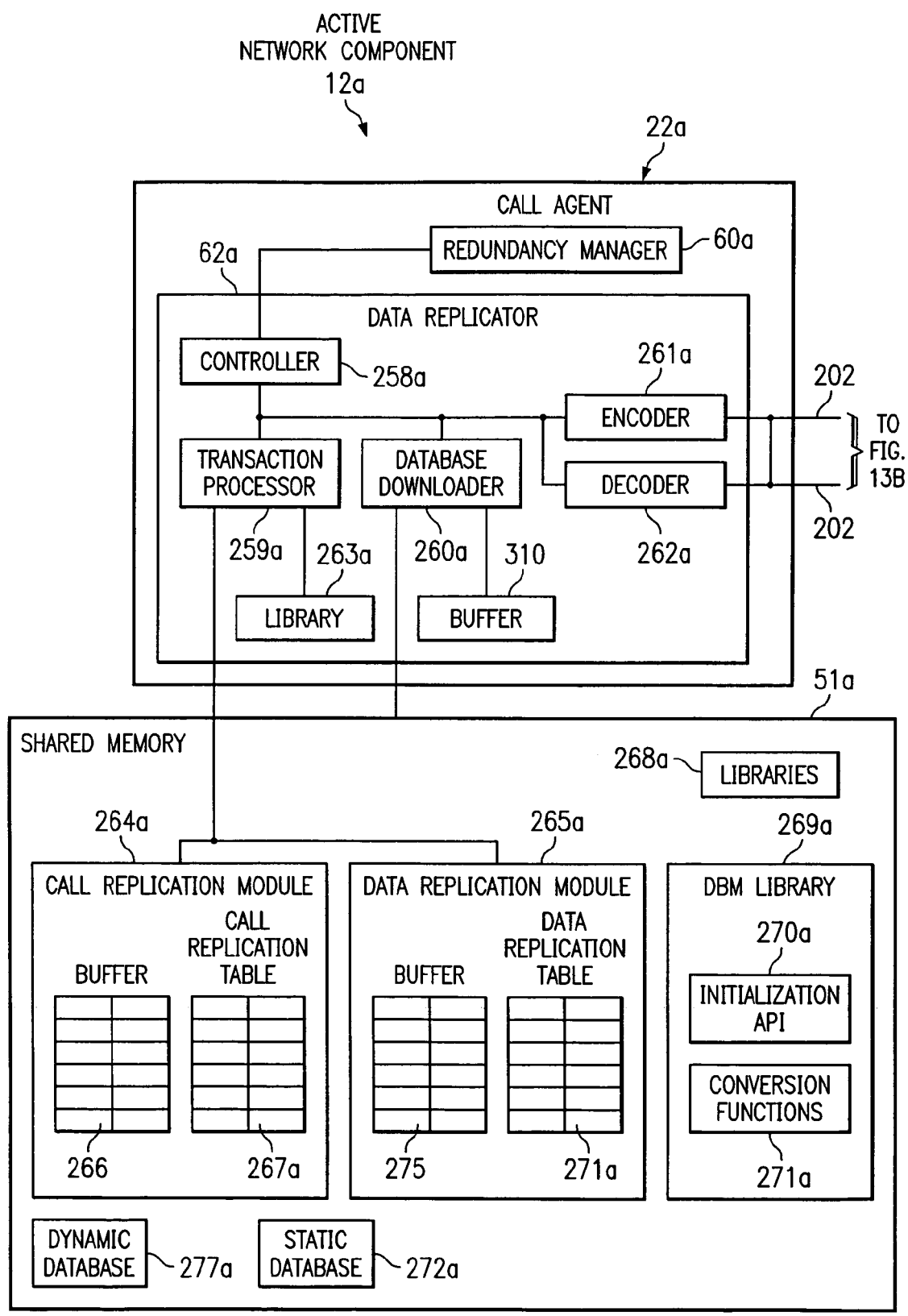
FIG. 13 is a block diagram illustrating example network components comprising call agents with data replicators.
Figure 13B:
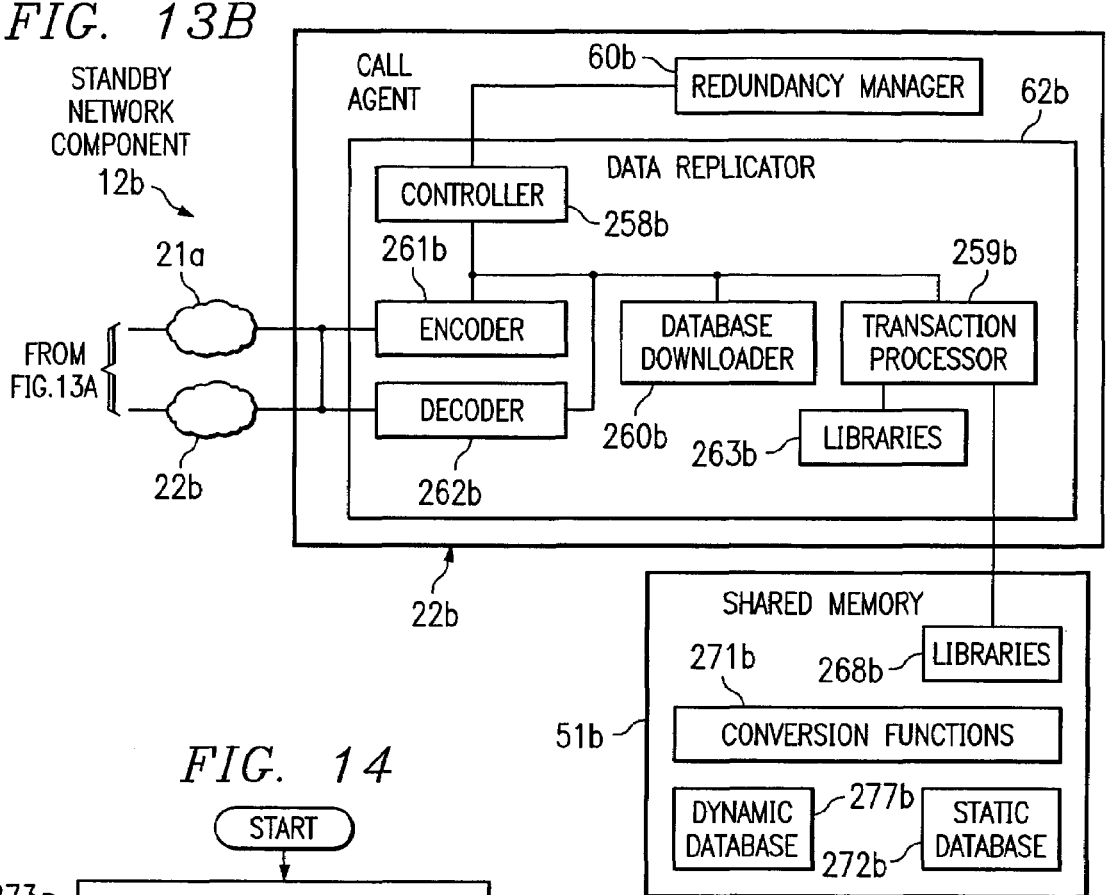

FIG. 13 is a block diagram illustrating example network components 12 comprising call agents 22 with data replicators 62. Data replicator 62a of active call agent 22a sends data to data replicator 62b of standby call agent 22b. Data may include information that standby call agent 22b may need in the event that call agent 22a switches to standby mode or becomes faulty, and call agent 22b switches to active mode to perform call agent operations. Data may include static data that typically does not change as calls are handled such as resource data, and dynamic data that may change as calls are handled such as call data associated with stable calls and provisioning data. Although call agents 22 are illustrated, data replicators 62 may be used to replicate data for any suitable redundant network component 12.

Data replicator 62a includes modules such as a controller 258a, a transaction processor 259a, a database downloader 260a, an encoder 261a, a decoder 262a, and libraries 263a. Controller 258a controls the operations of the modules of data replicator 62a in response to instructions from redundancy manager 60a. Transaction processor 259a retrieves data and sends the data to encoder 261a. Database downloader 260a sends all or a portion of a database including, for example, static and dynamic data to encoder 261a. Database downloader may use a buffer 310 to store data to be sent to encoder 261a.

Encoder 261a encodes and sends data to standby network component 12b, and may test standby network component 12b by sending test messages to standby network component 12b. Decoder 262a decodes messages received from network component 12b, and receives test messages from network component 12b. Library 263a may include application programming interfaces for replicating data. For example, library 263a may provide application programming interfaces that gather dynamic data such as call data from stable calls.

Shared memory database 51a includes replication modules such as a call replication module 264a and a data replication module 265a. A replication module may include a buffer such as a first-in-first-out (FIFO) buffer that stores replication requests, and a replication table that tracks the requests stored in the buffer and the data sent to standby network component 12b. For example, call replication module 264a includes buffer 266 that stores replication requests for stable call data.

A call replication table 267a tracks the requests stored in buffer 266 and the data sent to network component 12b. Data replication module 265a includes buffer 275 that stores replication requests for provisioning data. A data replication table 271a tracks the requests stored in buffer 275 and data sent to network component 12b. Multiple buffers 266 and 275 may be used in a replication module to reduce competition for buffers 266 and 275. Although the illustrated replication modules 264a and 265a store update requests for call data and provisioning data, respectively, replication modules may store update requests for any suitable type of data such as billing data.

Shared memory database 51a also includes libraries 268a and a static database 272a and a dynamic database 277a. Network components 12 such as call agents 22 may store data in databases 272a or 277a using libraries 268a, and may insert update requests into buffers 266 and 275. Static database 272a may store static data such as resource data. Dynamic database 277a may store dynamic data such as call data or feature data.

A database manager (DBM) library 269a includes application programming interfaces and functions that may be used to upgrade replicated data. Initialization API 270a may be used to gather conversion functions 271a. Conversion functions 271a may be used to convert data from a format associated with one version to a format associated with a different version. Conversion may be performed from an older version format to a newer version format or from a newer version format to an older version format.

Standby network component 12b includes modules substantially similar to the modules of active network component 12a. As standby network component 12b receives data from active network component 12a, data replicator 62b stores the data in libraries 268b of shared memory database 51b.

Figure 14:
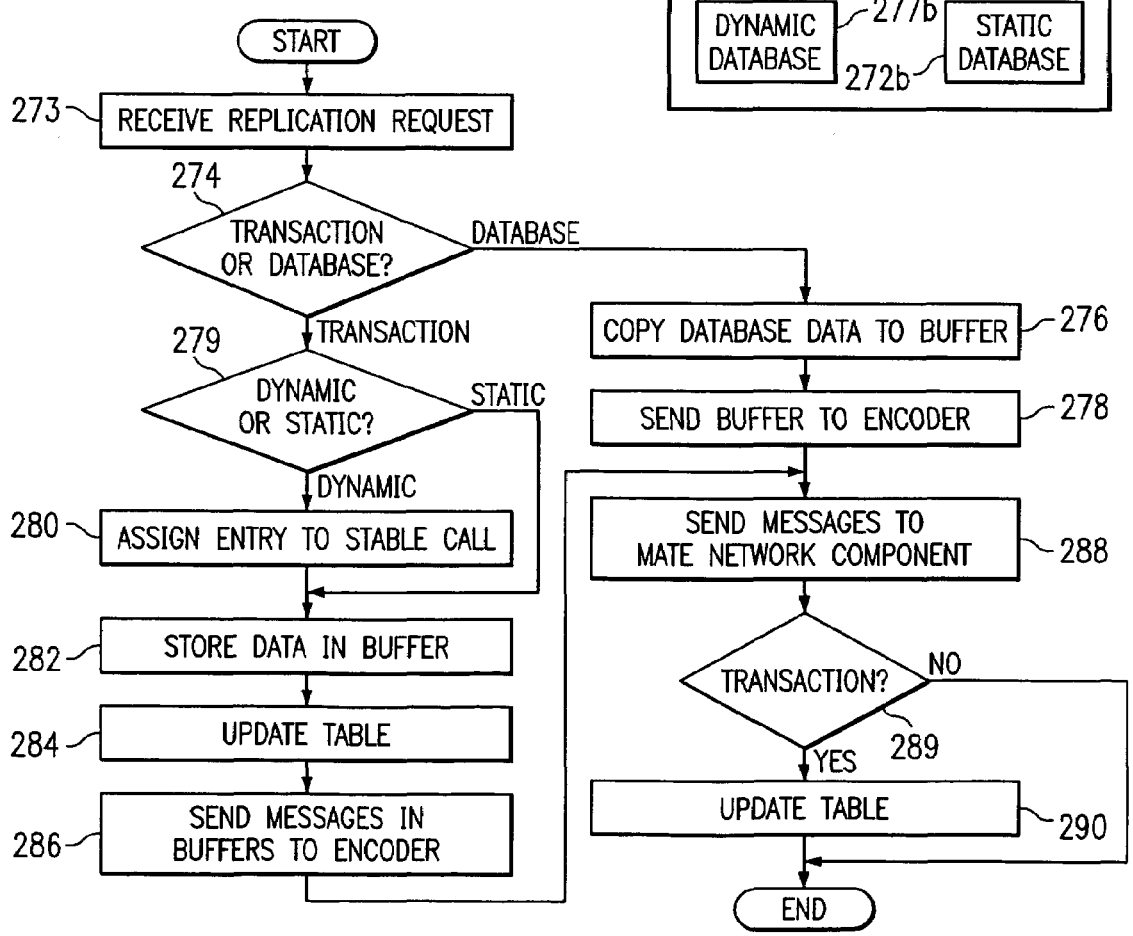
FIG. 14 is a flowchart illustrating one example of a method for data replication.

FIG. 14 is a flowchart illustrating one example of a method for data replication for network components 12 of FIG. 13. The method receives a replication request at step 273. At step 274, the request may request replication of transaction data such as static or dynamic data stored in a database or the request may request replication of a database that includes static and dynamic data. If the request is for a database, the method proceeds to step 276, where database downloader 260a copies database data from static database 272a to buffer 310. Static database 272a may comprise, for example, resource data. Database downloader 260a sends buffer 310 to the encoder 261a at step 278, and the method proceeds to step 288.

If the request is for replication of transaction data at step 274, the method proceeds to step 279, where the data to be replicated may be dynamic or static. If dynamic data is to be replicated at step 279, the method proceeds to step 280, where transaction processor 259a assigns an entry of a replication table to a stable call. For example, call replication table 267a is used to track call data and feature data, and data replication table 271a is used to track provisioning data. The method then proceeds to step 288. If static data is to be replicated at step 279, the method proceeds directly to step 282.

Messages associated with a stable call are stored in buffers 310 at step 282. The update requests may be received from processes 50. Replication tables are updated at step 284. For example, call replication table 276a is updated when data is stored in buffers 310 and data replication table 271a is updated when data is stored in buffers 310. Transaction processor 259a sends messages in buffers 310 to encoder 261a at step 286, and the method proceeds to step 288.

At step 288, encoder 261a encodes and sends the messages to standby network component 12b via communication links 202. At step 289, if transaction data was replicated, the method proceeds to step 290. At step 290, the replication table may be updated to show that the data has been sent to standby network component 12b. After updating the replication table, the method terminates. At step 289, if a database was replicated, the method terminates.

A redundant network component 12 may use a data replicator 65 to replicate data to a mate network component 12. Data replicator 65 allows for reliable data replication of data stored in shared memory database 51 by using a replication table to track data replicated to a mate network component 12.

Live Software Upgrade

FIG. 15 is a flowchart illustrating one example of a method for upgrading software on redundant network components 12 of FIG. 13. The method may be used to upgrade software on redundant network components 12 while processing stable calls. In the illustrated example, during a first iteration, active network component comprises network component 12a such as call agent 22a, and standby network component comprises network component 12b such as call agent 22b.

The method begins at step 320, where software and data are installed on a standby network component 12b. For example, newer software and data may be installed to replace older software and data. The installed data may include static data tables and dynamic data tables. Data tables are described in more detail in connection with FIGS. 16A through 16D. Standby network component 12b may be taken out of service in order to install the software, and then may be brought up in standby mode after installation.

Data replicators 62 exchange version identifiers describing the versions of data located at network components 12 at step 322. The version identifiers for the data may be distinct from the software version, in order to allow for upgrading the software without upgrading the data.

At step 323, data replicator 62a of active network component 12a determines whether the data located at active network component 12a is of a newer version than data located at standby network component 12b. If the versions are different, the method proceeds to step 324, where data replicator 62a converts the data to the version of the data located at standby network component 12b. Data replicator 62a may use conversion functions 271a to perform the conversion. The method proceeds to step 325. At step 323, if the versions are not different, the method proceeds directly to step 325. At step 325 active network component 12a transfers the data to standby network component 12b.

At step 326, data replicator 62b of standby network component 12b determines whether the data received from active network component 12a is of an older version than data located at standby network component 12b. If the versions are different, the method proceeds to step 328, where data replicator 62b converts the received data to the version of the data located at standby network component 12b. Data replicator 62b may use conversion functions 271b to perform the conversion. At step 330, an audit upgrade is performed. Element management system 24 may perform an audit of network components 12 in order to verify that the data replication is correct. The method proceeds to step 332. At step 326, if the versions are not different, the method proceeds directly to step 332.

Active network component 12a is switched from an active mode to a standby mode at step 332. Standby network component 12b is switched from a standby mode to an active mode at step 334. The switching may be performed according to the method described in connection with FIG. 11. At step 336, the upgrade may be cancelled. If the upgrade is cancelled, the method returns to step 322, where network components 12 exchange version identifiers.

At steps 324 through 330 during the second iteration, the active network component comprises network component 12b, and the standby network component comprises network component 12a. Data originally on network component 12b is replicated on network components 12a. If the upgrade is continued, the method proceeds to step 338, where the software is installed on standby network component 12a. After switching network component 12a to an active mode, the method terminates.

FIGS. 16A through 16D illustrate examples of data tables from a series of data versions. FIG. 16A illustrates a data table 340a of version 1 that includes fields 342. Field 342a lists a subscriber identifier for a subscriber. A subscriber may be associated with a phone number, which is listed in field 342b. Fields 342c and 342d identify whether a subscriber has subscribed to call waiting or call forwarding, respectively.

FIG. 16B illustrates a data table 340b of version 2. Data table 340b includes a field 342e that describes whether a subscriber has subscribed to a conference call feature. A new field 342 may be required to be added to a specific position of a data table 340, such as the last column of data table 340.

FIG. 16C illustrates a data table 340c of version 2+n. Data table 340c includes a field 342f that describes whether a subscriber has subscribed to a "zoom" feature, which replaces the call waiting and call forwarding features. A "zoom" feature includes call waiting, call forwarding, or both call waiting and call forwarding. That is, if a subscriber subscribes to either call waiting, call forwarding, or both features, the subscriber subscribes to the zoom feature. Call waiting field 342c and call forwarding field 342d may be included in data tables 340 for versions 2 through 2+n to allow network components 12 to communicate with other network components 12 that have data tables 340 for a version 2 through 2+n, and to allow network components 12 to go back to a version 2 through 2+n.

FIG. 16D illustrates a table 340d of version 2+n+1. At version 2+n+1, call waiting field 342c and call forwarding field 342d have been eliminated. As a result, version 2+n+1 and subsequent versions cannot be converted back to version 2.

The method may be used to upgrade software on redundant network components 12 while processing stable calls. By maintaining representations of calls in shared memory 51, stable calls may be processed while the software is upgraded. As a result, system 10 allows for a faster and more secure upgrade of redundant network components 12.

Recording Trace Messages

FIG. 17 is a block diagram illustrating one example of a trace message system 360 for recording trace messages from process threads 53 of processes 50. Process threads 53 generate trace messages that describe the operation of processes 50. Trace messages may describe a variety of operations, which may be categorized by topic. Topics may include, for example, platform management, redundancy, data replication, feature processing, call processing, data traffic, and/or performance measurement. A trace message may be associated with one or more topics.

Process manager 58 includes a trace module 362, which manages the processing of trace messages. Shared memory 51 include traces interfaces 364, a trace buffer 366, and a trace file 368. Process threads 53 may use trace interfaces 364 to process trace messages. Trace message interface 370 may be used by process threads 53 to generate trace messages. Initialization/control interface 372 may be used to initialize and control data relating to trace messages such as data included in trace buffer 366. Trace buffer 366 stores trace messages received from process threads 53 in a trace message field 375. The trace messages may be stored in the order received from process threads 53. Trace file 368 may be used to store trace messages transferred from trace buffer 366. Trace file 368 may organize trace messages according to process 50.

A description 376 may be added to a trace message. Description 376 may include, for example, any number of fields. An importance level field 378 describes the level of importance of the trace message. A topic field 379 identifies one or more topics associated with the trace message. One or more topics and/or importance levels may be selected to be recorded by trace message system 360. A process identifier 380 identifies process 50, and a thread identifier identifies process thread 53. A timestamp 384 records the time the trace message is entered in trace buffer 366. A source code identifier 386 identifies the source code file and line number of the trace message. A flag 374 may be used to indicate that a buffer entry for a trace message has been assigned to a process thread 53.

FIG. 18 is a flowchart illustrating one example of a method for recording trace messages from process threads 53 of processes 50 using trace message system 360 of FIG. 17. The method allows for a process thread 53 to be assigned a buffer entry of trace buffer 366 while another process thread 53 may be writing to another buffer entry of trace buffer 366, which may allow for more efficient recording of trace messages.

The method begins at step 390, where trace messages are generated by process threads 53. Process threads 53 may use trace message interface 370 to generate the trace messages. At step 392, trace module 362 receives a request for a buffer entry of trace buffer 366 of shared memory 51 from a process thread 53. The use of shared memory 51 may enhance the speed of generating trace messages because process threads 53 are not blocked during a disk access. The requests are received in a time order, and each process thread 53 is allocated a buffer entry in the time order.

Trace module 362 assigns an available buffer entry of trace buffer 366 at step 394. Trace module 362 may track the last assigned buffer entry of trace buffer 366, and may assign the next buffer entry of trace buffer 366 as the next available buffer entry. The buffer entry may be assigned by marking flag 374 of the buffer entry with a process thread identifier.

In order to prevent assigning a buffer entry to more than one process thread 53, a process thread 53 may be required to lock a mutual exclusion object in order to be assigned a buffer entry. A mutual exclusion object comprises a program object that allows multiple process threads 53 to share trace buffer 366, but not simultaneously. Process thread 53 that requests a buffer entry locks the mutual exclusion object from other process threads 53 while the buffer entry is being assigned. Once a buffer entry has been allocated, each process thread 53 is free to record its message its own pace, without making other threads wait. After the buffer entry is assigned, the method proceeds to step 396.

At step 396, trace module 362 determines whether there is a next buffer entry request. If there is a next buffer entry request, the method returns to step 394, where trace module 362 assigns the next available buffer entry to the next buffer entry request. If there is no next buffer entry request, the method terminates.

Step 398 may be performed before, simultaneous with, or after step 396. For example, a buffer entry may be assigned to a trace message while another trace message is being entered into trace buffer 366.

Trace module 362 determines the importance level of the trace message at step 398. Importance levels may be selected such that trace messages of the selected importance levels are recorded. If the importance level is a selected importance level at step 344, the method proceeds to step 406, where the trace message is recorded in trace buffer 366. If the importance level is not a selected importance level, the method proceeds to step 346, where trace module 362 determines the topic or topics of the trace message. Certain topics may be selected such that trace messages of the selected topics are recorded. If any of the topics are selected topics at step 348, the method proceeds to step 350, where the trace messages are recorded in trace buffer 366. If none of the topics are selected topics, the method terminates.

At step 406, process thread 53 writes the trace message to the assigned buffer entry of trace buffer 366. At step 408, trace module 362 copies the trace message from trace buffer 366 to trace file 368. The trace messages of trace file 368 may be organized according to the process 50 that generated the trace messages. By organizing shared memory 51 in a circular fashion, the total amount of memory allocated to trace messages can be kept within bounds. If shared memory 51 becomes full, the trace messages may be simply discarded until there is room in shared memory 51. In an alternative example, existing trace messages may be overwritten. After the trace message is copied, the method terminates.

Trace messages record the processing of a call in shared memory 51. The method allows for a process thread 53 to be assigned a buffer entry of trace buffer 366 while another process thread 53 may be writing to another buffer entry of trace buffer 366. As a result, the method may provide for more efficient recording of trace messages.

A technical advantage of one example is that trace functions may be provided for a multiple process or multiple thread system, for example, a telecommunication network, where the processes may be single threaded or multi-threaded. The example may provide a centralized, time ordered trace module, where trace messages output by the multiple threads of multiple processes may be collected together and placed in time sequence with minimal performance impact.

A technical advantage of another example may be that the time order of trace messages is preserved in an efficient manner. Threads of the same process or different processes make requests to record a trace message. These requests are processed in a time order, and each thread is allocated a buffer entry in a common shared memory table in the time order. Accordingly, the time order of the trace messages is preserved.

A technical advantage of another example may be an efficient manner of allocating buffer entries for recording trace messages. Buffer entries are allocated in sequence where one requesting thread has to wait while an buffer entry is being allocated to another thread. Once a buffer entry has been allocated, each thread is free to record its message into the buffer entry at its own pace, without making other threads wait. Accordingly, the example may provide greatly enhanced performance in a multi-thread and/or multi-process system.

A technical advantage of another example may be the use of shared memory for storing information that is shared by multiple threads or processes. The use of the shared memory may enhance the speed of generating trace messages because the threads or processes are not blocked during a disk access. The trace messages included in the shared memory are transferred to non-volatile storage such as hard disk periodically by a transfer thread dedicated to performing this task. By organizing the shared memory in a circular fashion, the total amount of memory allocated to trace can be kept within bounds. If the shared memory becomes full, the trace messages may be simply discarded until there is room in the shared memory. In an alternative example, existing trace messages may be overwritten.

Signaling Adapters

Figure 19:
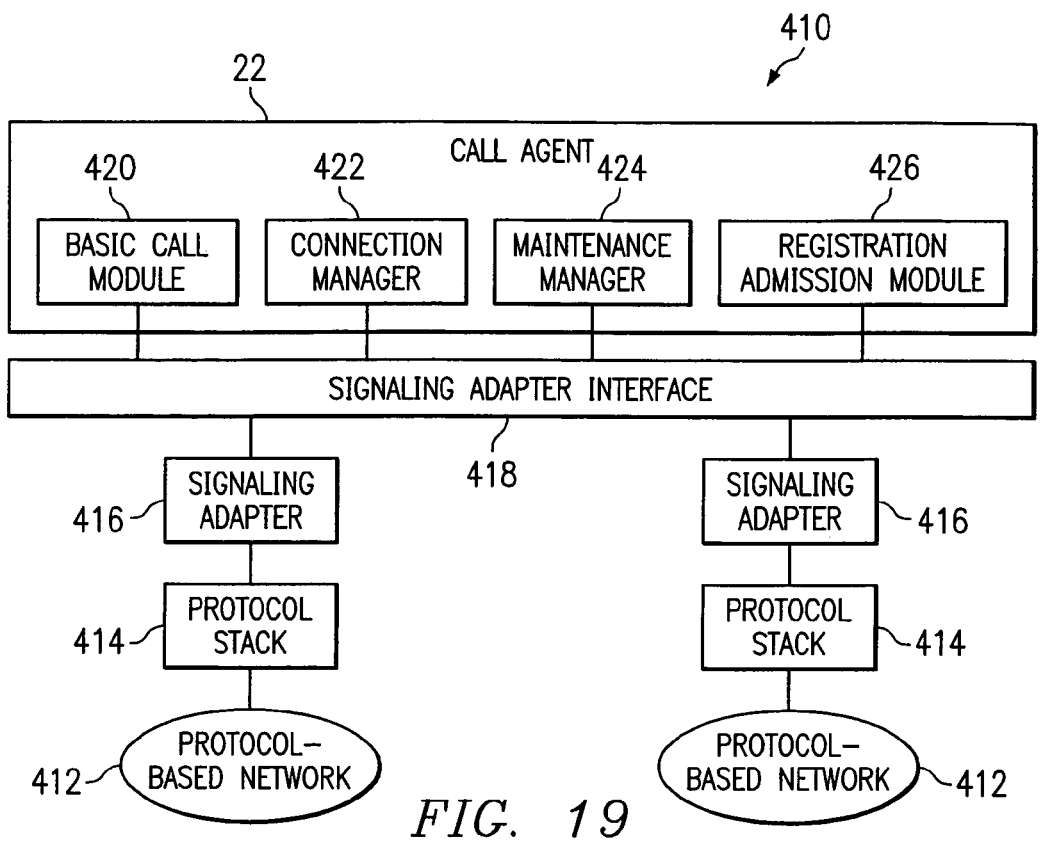
FIG. 19 is a block diagram illustrating one example of a multiple communication protocol system for communicating messages in a multiple communication protocol network.

FIG. 19 is a block diagram illustrating one example of a multiple communication protocol system 410 for communicating messages in a multiple communication protocol network. Multiple communication protocol system 410 allows a network component 12 to process messages based on multiple communication protocols. Communication protocols may include, for example, a Signaling System 7 (SS7) protocol, an Integrated Services Digital Network (ISDN) protocol, an H.323 protocol, a Session Initiation Protocol (SIP), and a Media Gateway Control Protocol (MGCP).

Multiple communication protocol system 410 includes any number of protocol-based networks 412, protocol stacks 14, signaling adapters 16, a signaling adapter interface 18, and call agent 22. Protocol-based networks 412 may include devices and communication links operating according to any of a number of communication protocols. One protocol-based network 412 may operate according to one communication protocol, and another protocol-based network 412 may operate according to another communication protocol. Protocol stack 414 receives and processes messages based on a specific communication protocol. Protocol stack 414 is described in more detail in connection with FIG. 20. Signaling adapter 416 converts messages based on a specific protocol to a generic protocol, and is described in more detail in connection with FIG. 20. Signaling adapter interface 418 receives the messages based on a generic format and sends the messages to call agent 22. Signaling adapter interface 418 may route the messages from specific signaling adapters 416 to specific modules of call agent 22.

Call agent 22 includes modules such as a basic control module 420, a connection manager 422, a maintenance manager 424, and a registration/admission module 426. Basic control module 420 establishes, monitors, and clears calls. Basic control module 420 may include a basic call state machine that responds to messages describing events occurring in protocol-based networks 412. Connection manager 422 dynamically creates and destroys a bearer path of a packet network. Connection manager 422 may be required to receive messages from protocol-based networks 412 that use bearer paths. Maintenance manager 424 provisions, configures, and provides fault management for signaling adapters 416 and protocol stacks 414. Registration/admission module 426 registers addresses for processed calls.

Figure 20:
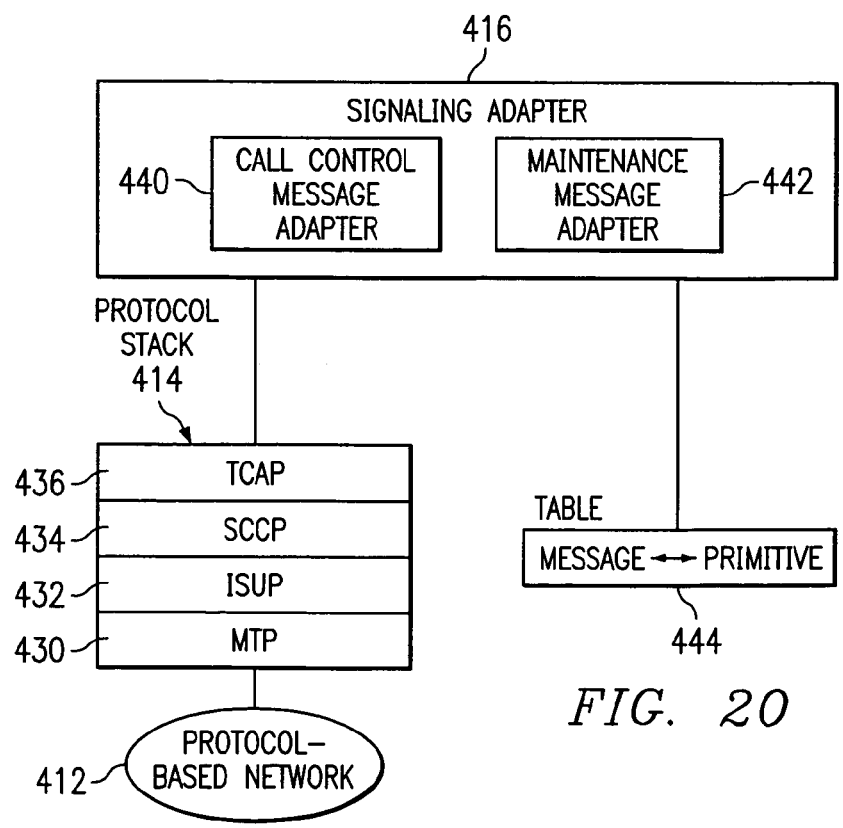
FIG. 20 illustrates examples of a protocol-based network, a protocol stack, and a signaling adapter of FIG. 19.

FIG. 20 illustrates examples of protocol-based network 412, protocol stack 414, and signaling adapter 416 of FIG. 19. In the illustrated example, protocol-based network 412, protocol stack 414, and signaling adapter 416 operate according to a Signaling System 7 protocol. Any suitable communication protocol, however, may be used.

Protocol stack 414 includes several layers. A message transfer part (MTP) layer 430 provides functions for basic routing of signaling messages for monitoring and controlling traffic within protocol-based network 412. An integrated services digital network user part (ISUP) layer 432 provides functions for setting up, coordinating, and taking down calls. ISUP layer 432 may include, for example, functions for initializing the ISUP protocol, registering with ISUP layer 432, sending ISUP messages to protocol-based network 412, providing events from protocol-based network 412, providing ISUP configuration, and signaling communication link failures.

A signaling connection control part (SCCP) layer 434 provides routing and management functions for transferring messages. A transaction capabilities application part (TCAP) layer 436 provides signaling functions for network databases. TCAP layer 436 may provide functions for accessing advanced intelligent network (AIN) features provided by protocol based network 412.

Signaling adapter 416 includes adapters such as call control message adapter 440 and maintenance message adapter 442 that convert messages based on a specific communications protocol to a generic protocol. The conversion may involve converting a message to a generic primitive. An adapter may convert messages for a specific module of call agent 22. Call control message adapter 440 may convert messages for basic control module 420. The messages may be related to call establishment such as an initial address message, call session such as a call progress message, and call teardown such as a release message.

Maintenance message adapter 442 may convert messages for maintenance manager 424 of call agent 22. The messages may relate to bearer circuit validation such as a continuity check message, bearer circuit reservation and status such as a circuit reserve message, and bearer circuit maintenance such as a circuit/circuit group block message. Adapters 440 and 442 may use a table 444 for converting the messages to a generic format. Table 444 may include entries that associate a message with a generic primitive of the generic format.

FIG. 21 is a flowchart illustrating one example of a method for communicating messages in a multiple communication protocol network using multiple communication protocol system 410 of FIG. 19. The method begins at step 450, where protocol stacks 414 receive messages from protocol-based networks 412. A protocol stack 414 processes a message according to the communication protocol of an associated protocol-based network 412 at step 452. Signaling adapters 416 receive the messages from protocol stacks 414 and convert the messages to a generic format at step 454. Call control message adapter 414 converts messages related to call control, and maintenance message adapter 442 converts messages related to maintenance. Adapters 440 and 442 may use table 444 to convert the messages to generic primitives of the generic format.

The messages are sent to modules 420 and 424 of call agent 22 at step 456. Call control message adapter 440 sends messages to basic control module 420, and maintenance message adapter 442 sends messages to maintenance manager 424. After sending the messages to call agent 22, the method terminates.

A signaling adapter 416 translates messages communicated according to any of a number of communication protocols to a generic protocol, so that the messages may be processed by signaling adapter interface 418. Messages communicated according to a new communication protocol may be processed by adding a signaling adapter 416 associated with the new communication protocol. Thus, multiple communication protocol system 410 may provide for a flexible mechanism for processing messages communicated according to a number of communication protocols.

Media Gateway Adapter

FIG. 22 is a block diagram illustrating one example of a media gateway adapter 460. Media gateway adapter 460 may provide an interface between call agent 22 and media gateway 20. Media gateway adapter 460 includes thread pairs 462. A thread pair comprises a communication protocol control stack thread such as a media gateway control protocol (MGCP) control stack (MCS) thread 464 and a media gateway adapter (MGA) thread 466. An MCS thread 464 listens for and receives messages from other network components 12 through one or more ports 468. Messages may include user datagram protocol (UDP) messages, transmission control protocol (TCP), or other suitable protocol. MCS thread 464 forwards the received messages to MGA thread 466. MGA thread 466 processes the messages according to a communications protocol such as MGCP. By using an MCS thread 464 to receive messages and an MGA thread 466 to process the messages, the possibility of overloading MGA thread 466 is reduced. One or more thread pairs 462 may run on a processor. The number of thread pairs 462 per processors may be configured by a user.

An additional communication protocol control stack thread for performing other types of protocol processing may be added to thread pair 462. For example, a communication protocol control stack thread may be added to perform MEGACO protocol processing. MCS thread 464 determines the type of communication protocol of a message and routes the message to communication protocol control stack thread according to the type.

An MGA router 470 receives a request for a thread pair 462 and assigns a thread pair 462 in response to the request. The request may be received from media gateway 20 through a thread pair 462 or from basic call module 420. MGA router 470 may allocate a thread pair 462 for an entire media gateway 20 or for a specific termination, depending upon the configuration of media gateway adapter 460 and the message.

MGA router 470 may allocate thread pair 462 based on a processor utilization algorithm. MGA router 470 may determine the relative processor utilization of each thread pair 462, and assign the thread pair 462 for which the relative process utilization is the lowest. The assigned thread pair 462 may differ from the thread pair 462 that received the request from media gateway 20. For example, the thread pair 462 that receives the request may be over-utilized, so MGA router 470 may assign an underutilized thread pair 462. Accordingly, media gateway adapter 460 may allow for more efficient processor utilization.

BCM router 472 allocates BCM threads 474 for messages to be sent to basic call module 420. BCM router 472 may allocate BCM threads 474 based upon BCM thread load.

Figure 23:
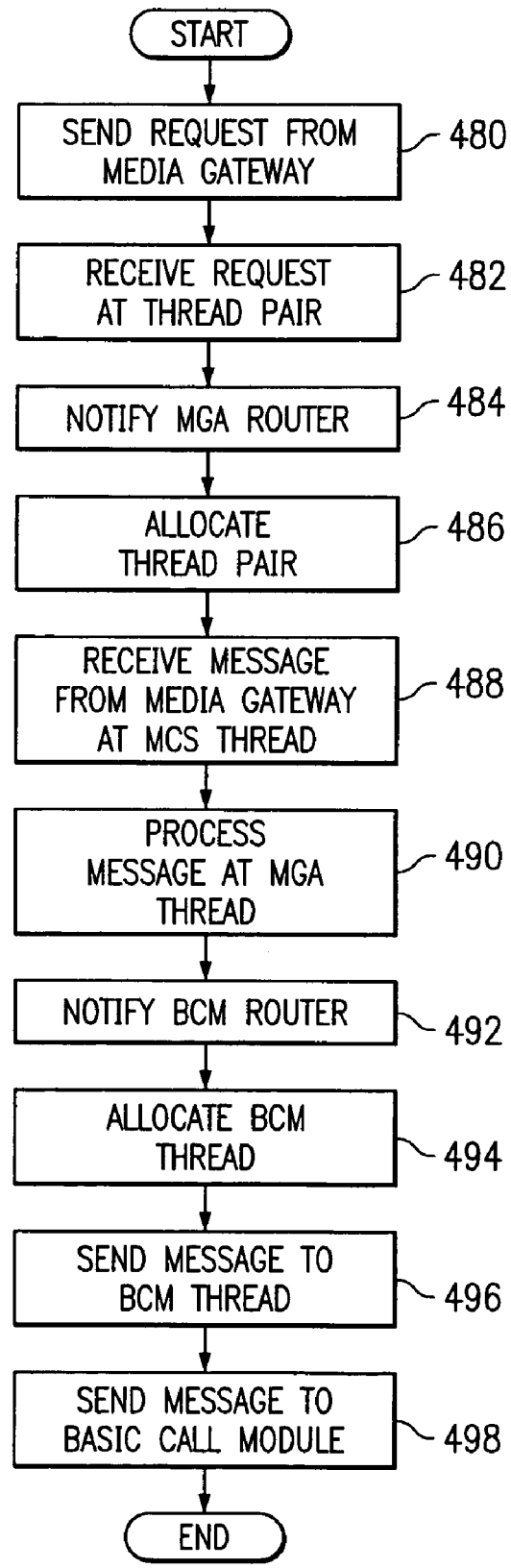
FIG. 23 is a flowchart illustrating one example of a method for communicating messages from a media gateway to a call agent using the media gateway adapter of FIG. 22.

FIG. 23 is a flowchart illustrating one example of a method for communicating messages from media gateway 20 to call agent 22 using media gateway adapter 460 of FIG. 22. The method starts at step 480, where media gateway 20 sends a request to media gateway adapter 460. Thread pair 462 receives the request at step 482. At step 484, thread pair 462 notifies MGA router 470 of the request. In response to the request, MGA router 470 allocates a thread pair 462 at step 486. MGA router 420 may allocate a thread according to the processor utilization of the thread.

Media gateway 20 sends a message, which is received at MCS thread 464 at step 488. MCS thread 464 forwards the message to MGA thread 466. MCS thread 464 may determine a communications protocol associated with the message, and forward the message to an MGA thread 466 corresponding to the communications protocol. MGA thread 466 processes the message at step 490. BCM router 472 is notified of the message at step 492. In response, BCM router 472 allocates a BCM thread 474 to the message at step 494. MGA router 470 sends the message to the assigned BCM thread 474 at step 496. At step 498, BCM thread 474 sends the message to basic call module 420. After sending the message, the method terminates.

Media gateway adapter 460 may be used to communicate messages from media gateway 20 to call agent 22. Media gateway adapter 460 allows for more efficient processor utilization by using distributed processing.

Feature Server

FIG. 24 is a block diagram illustrating one example of feature server 26 that provides features to subscribers. Telecommunications networks provide features and services such as call waiting and three-way calling to subscribers. The service logic programs for the features typically reside in the switch of a public switched telephone network (PSTN). As a result, features are generally controlled by a switch vendor, and not a service provider. Some features may be transferred outside of the switch using distributed architectures such as the advanced intelligent network (AIN). Other features, however, remain at the switch in these conventional AIN architectures due to the complexity of the interaction required between the elements of any distributed architecture.

A subscriber may subscribe to features of a telecommunications network such as call waiting or three-way calling. Some subscribers may subscribe to a feature set including some features, for example, call waiting and three-way calling, while other subscribers may subscribe to a feature set including other features, for example, call waiting and selective call acceptance. Additionally, feature server 26 may provide subscribers of different points of presence with different feature sets. System 10 provides the appropriate feature set selected by the subscribers.

Features may include Class 5 features that may typically be provided by a Class 5 office. Features may include a call waiting feature, which provides a mechanism to notify a subscriber engaged in a first call of a second call and to allow the subscriber to receive the second call. A three-way calling feature allows a subscriber engaged in a call with a second party to include a third party in the call and have a three-party conference call. Additionally, a selective call acceptance feature permits incoming calls only from telephone numbers predetermined by a subscriber. A selective call rejection feature blocks incoming calls from telephone numbers predetermined by a subscriber.

A feature may include providing a seven (7) digit map for collecting a seven digit telephone number from a subscriber making a local call. Different Class 5 features may be provided to different subscribers. For example, a seven (7) digit map may be provided to a subscriber in a point of presence that uses seven (7) digit telephone numbers for local calls, and a ten (10) digit map may be provided to a subscriber in a point of presence that uses ten (10) digit telephone numbers for local calls. Thus, system 10 provides a wide variety of features to a subscriber in a telecommunications network.

Feature server 26 includes service logic programs 540 coupled to a feature interaction mechanism 542, which is in turn coupled to a database table 544 and a communications stack 546. A service logic program 540 provides instructions for a specific feature set, or service. Feature sets, or services, may be identified by service identifiers. For example, service logic program 540a may provide instructions for call waiting, three-way calling, and call transfer, while service logic program 540b may provide instructions for distinctive ringing and selective call rejection. A subscriber may subscribe to a feature set provided by a feature server 26. For example, one subscriber may subscribe to a feature set provided by feature server 26a, and another subscriber may subscribe to a feature set provided by feature server 26b.

Feature interaction mechanism 542 manages the process of providing features. Feature interaction mechanism 542 identifies a subscriber making a call, determines a feature set associated with the subscriber, accesses a service logic program 540 corresponding to a feature of the feature set, and processes the call according to instructions provided by service logic program 540 or database table 544. Feature interaction mechanism 542 may access database table 544 in order to determine the feature set associated with the subscriber. Database table 544 may comprise a table of subscriber identifiers, their associated feature sets identified by service identifiers, and associated detection points. A database manager (DBM) 548 may be used by feature interaction mechanism 542 to access information from database table 544.

Communications stack 546 translates communication protocol. For example, communications stack 546 may translate, for example, Session Initiation Protocol (SIP), Internet Protocol (IP) and Transmission Control Protocol/Internet Protocol (TCP/IP).

Feature server 26 allows a subscriber to subscribe to a particular feature set, and then provides the feature set to the subscriber without any action from a switch of a PSTN. Thus, system 10 allows for a service provider to efficiently provide feature sets to subscribers.

Call Waiting

Figure 25A:
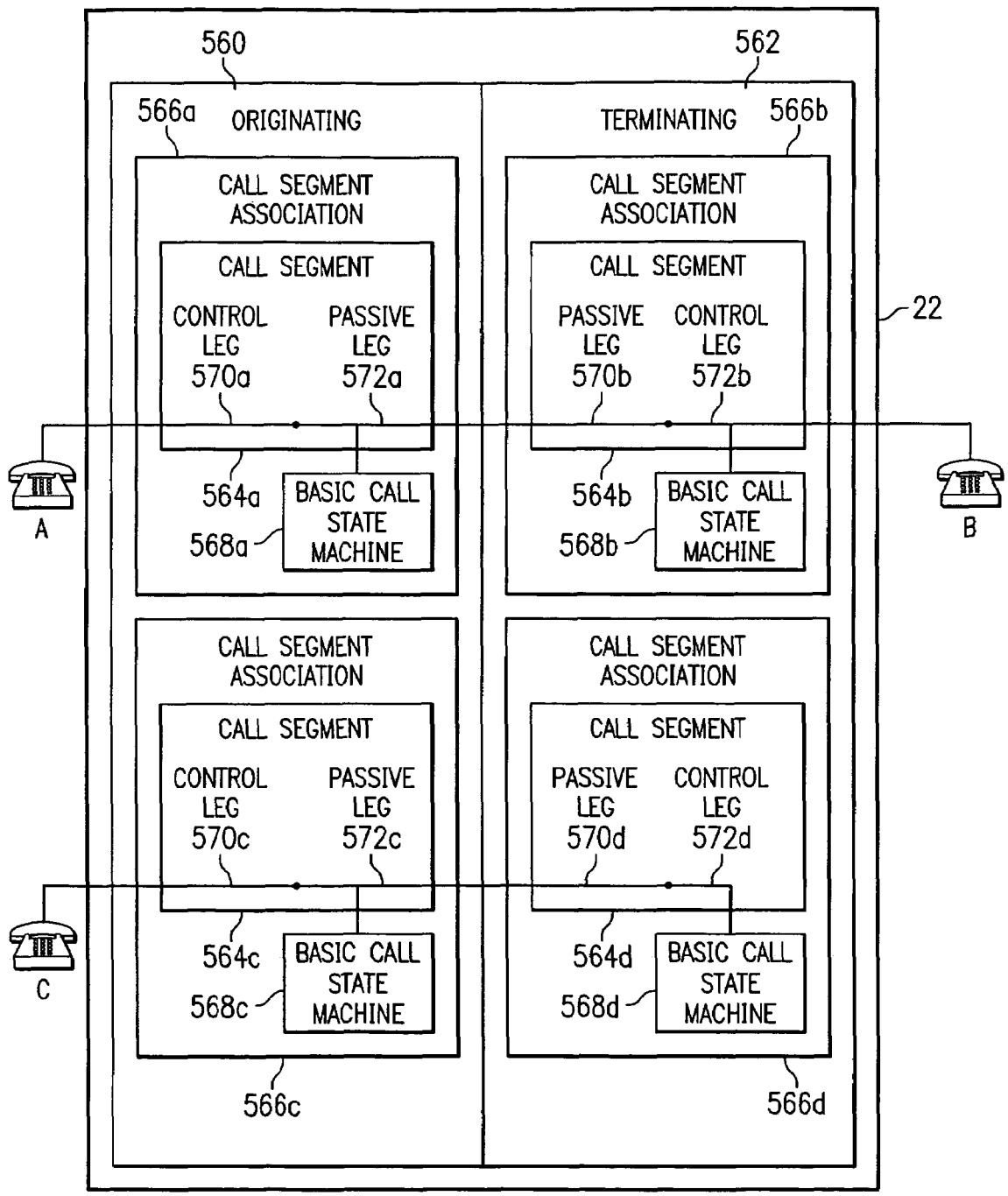

FIGS. 25A and 25B are half call model representations illustrating examples of call agent 22 and feature server 26 of FIG. 24 providing a call waiting feature. A method for providing a call waiting feature is described in more detail in connection with FIG. 26.

FIG. 25A illustrates telecommunications device A initiating a call to telecommunications device B. To process a call, call agent 22 creates call objects including originating call objects 560 and terminating call objects 562. Call objects include information about a call and information about processing the call. Call agent 22 may access call objects to determine a state of a call and how to respond to a change in the state of a call. Originating call objects 560 are generated to process the side of a call from telecommunications device A that originates, or initiates, the call. Terminating call objects 562 are generated to process the side of the call that goes to telecommunications device B that terminates, or receives, the call. Originating call objects 560 and terminating call objects 562 include call segments 564, call segment associations 566, and basic call state machines 568.

Call segments 564 represent communication paths between telecommunications devices. Each call segment 564 includes a control leg 570 and a passive leg 572. "Each" as used in this document means each member of a set or each member of a subset of the set. Control leg 570 represents a communication path to telecommunications device. Passive leg 572 represents a communication path from the control leg to other telecommunications devices. Basic call state machine 568 detects the state of a call, and may transmit the state information to feature server 26. Call segment association 566 defines associations between call segments 564.

As illustrated in FIG. 25A, call segments 564a and 564b, call segment associations 566a and 566b, and basic call state machines 568a and 568b are created for telecommunications devices A and B, respectively, in response to the states of call objects 560 and 562. Call segments 564a and 564b represent a communication path for a call between telecommunications devices A and B. Call segments 564c and 564d, call segment associations 566c and 566d, and basic call state machines 568c and 568d are generated for a call initiated by telecommunications device C to telecommunications device B.

Feature server 26 provides a call waiting feature that notifies telecommunications device B, which is engaged in a call with telecommunications device A, of the call initiated by telecommunications device C. Telecommunications device B may select to accept the call from telecommunications device C. As illustrated in FIG. 25B, telecommunications device B has accepted the call from telecommunications device C. Call segments 564c and 564d represent a communication path for the call between telecommunications devices C and B.

Figure 26A:
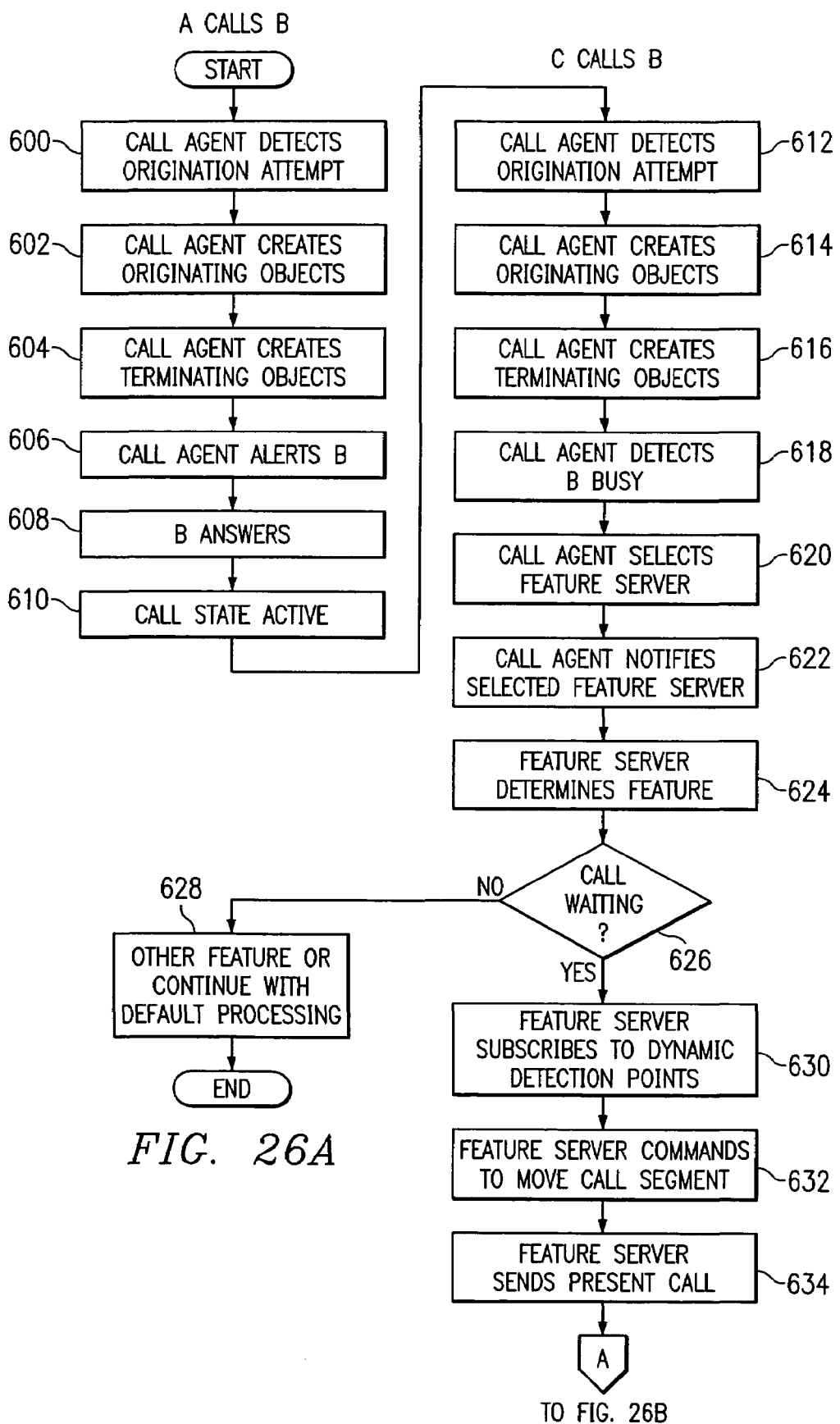
FIG. 26 is a flowchart illustrating one method for providing a call waiting feature in a telecommunications network.
Figure 26B:
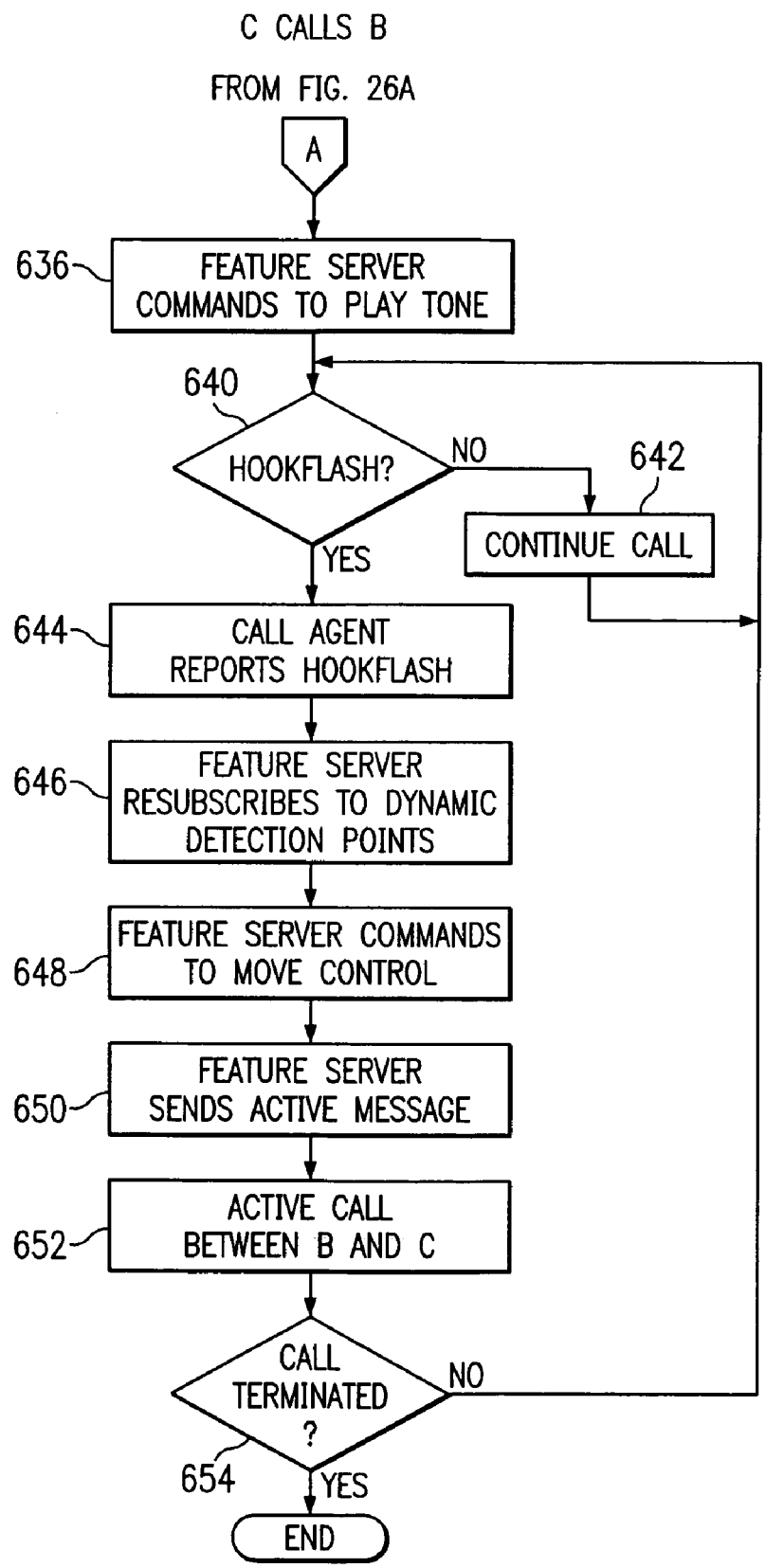

FIG. 26 is a flowchart illustrating one method for providing a call waiting feature in a telecommunications network. The method provides for telecommunications device B, which is engaged in a call with telecommunications device A, to accept a call initiated by telecommunications device C.

The method begins at step 600. Steps 600 through 610 describe processing a call from telecommunications device A to telecommunications device B. At step 600, call agent 22 detects an origination attempt from telecommunications device A. The origination attempt may result from inputting a telephone number of telecommunications device B into telecommunications device A. Call agent 22 creates originating call objects 560 at step 602. Originating call objects include call segment 564a, call segment association 566a, and basic call state machine 568a. Call agent 22 creates terminating call objects 562 at step 604. Terminating call objects 562 include call segment 564b, call segment association 566b, and basic call state machine 568b.

At step 606, call agent 22 alerts telecommunications device B of the call from telecommunications device A. Call agent 22 may alert telecommunications device B by sending a message to telecommunications device B that causes telecommunications device B to ring. B answers the call at step 608. The state of the call is active at step 610.

Steps 612 through 618 describe telecommunications device C calling telecommunications device B. At step 612, call agent 22 detects an origination attempt by telecommunications device C. Call agent 22 creates originating call objects 560 at step 614. Originating call objects 560 include call segment 564c, call segment association 566c, and basic call state machine 568c. Call agent 22 creates terminating call objects 562 at step 616. Terminating call objects 562 include call segment 564d, call segment association 566d, and basic call state machine 568d.

Call agent detects that telecommunications device B is busy at step 618. Call agent 22 selects a feature server 26 at step 620 using a user table. Call agent 22 may select feature server 26 according to a type of call waiting feature to which telecommunications device B subscribes. Alternatively, call agent 22 may select feature server 26 according to a load balancing protocol to distribute calls among multiple feature servers 26. At step 622, call agent 22 notifies the selected feature server 26 that telecommunications device B is busy and is using call segment association 566b.

At step 624, feature server 26 determines a feature appropriate for telecommunications device B with a detection point of busy. Feature server 26 may use database table 544 in order to determine a feature to which telecommunications device B subscribes. Feature server 26 may also determine whether telecommunications device B may accept a feature. For example, telecommunications device B may already be engaged in a call waiting process, and is not able to accept a call from telecommunications device C. Telecommunications device B may also be prohibited from receiving a call waiting feature because, for example, a subscription fee for a call waiting feature has not been paid.

At step 626, feature server 26 determines whether call waiting is an appropriate feature. If call waiting is not an appropriate feature, the method proceeds to step 628, where another feature is provided or the call is continued with default processing. After step 628, the method terminates. If call waiting is an appropriate feature, the method proceeds to step 630.

At step 630, feature server 26 subscribes to dynamic detection points in order to be notified when call agent 22 detects a subscribed detection point. Detection points may include, for example, a hookflash, a disconnect, an abandoned, or an exception detection point. A hookflash detection point may occur when a hook switch of telecommunications device B is momentarily depressed. A disconnect detection point occurs when either telecommunications device A or B terminates the call. An abandoned detection point may occur when telecommunication device C terminates the call. An exception detection point occurs when, for example, there is a failure in the processing of the call such as a failure of a communication path.

At step 632, feature server 26 commands call agent 22 to move terminating call segment 564d generated for telecommunications device C from call segment association 566d to call segment association 566b generated for telecommunications device B. At step 634, feature server 26 sends a present call command to call agent 22. In response, call agent 22 creates a communication path between telecommunication devices B and C. Path creation is successful if telecommunications device B accepts the call. Feature server 26 may perform steps 630 through 634 by sending one or more messages to call agent 22.

At step 636, feature server 26 commands call agent 22 to play a tone to telecommunications device B to alert telecommunications device B of the call initiated by telecommunications device C. At step 640, call agent 22 determines whether a hookflash detection point is detected. If a hookflash detection point is not detected, the method proceeds to step 642, where the call between telecommunications device A and B is continued and monitored for a hookflash detection point. If a hookflash detection point is detected, the method moves to step 644.

At step 644, call agent 22 reports the hookflash detection point to feature server 26. Call agent reports that a hookflash detection point has occurred at call segment 564b. Feature server 26 resubscribes to the dynamic detection points at step 646. At step 648, feature server 26 commands call agent 22 to move control from call segment 564b to call segment 564d. When control is moved, the state of call segment 564b is an inactive state, and the state of call segment 564d is an active state.

Feature server 26 sends an active command to call agent 22 at step 650. At step 652, the call between telecommunications devices B and C becomes active as call agent 22 updates the call. At step 654, call agent 52 monitors the call to determine if the call between telecommunications devices B and C is released at step 654. If the call is released, the method terminates. If the call is not released, the method returns to step 40, to determine whether a hookflash detection point has been detected.

Three Way Calling

Figure 27B:
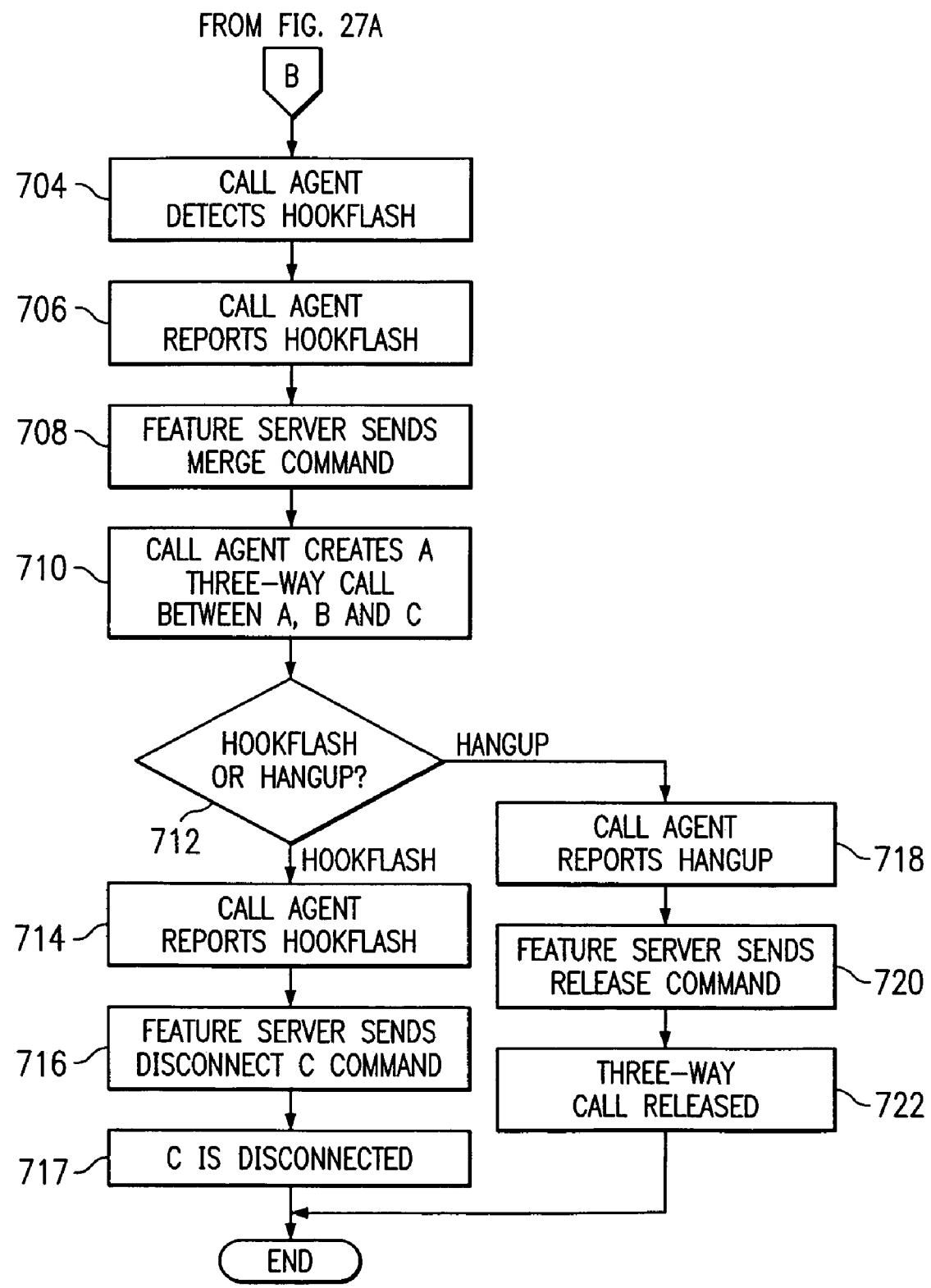
FIG. 27 is a flowchart illustrating one example of a method for providing a three-way calling feature.

FIG. 27 is a flowchart illustrating one example of a method for providing a three way calling feature. The method provides for a first telecommunications device, which is engaged in a call with a second telecommunications device, to initiate a call to a third telecommunications device.

The method begins at step 660. Steps 660 through 670 describe processing a call from telecommunications device A to telecommunications device B. Steps 660 through 670 may occur in a manner substantially similar to steps 600 through 610 as described with reference to FIG. 26.

At step 672, call agent 22 detects a hookflash from telecommunications device A or telecommunications device B. The telecommunications device that initiates the hookflash may be referred to as a "controller". Steps 674 through 678 describe call agent 22 selecting and notifying feature server 26 of the hookflash, and feature server 26 determining a feature. Steps 674 through 678 may be performed in a manner substantially similar to steps 620 through 624 of FIG. 26.

Feature server 26 determines whether the hookflash corresponds to a three-way call at step 680. If the hookflash does not correspond to a three-way call, the method proceeds to step 682 where another feature is selected or the call is continued according to a default processing, and the method is terminated. If the feature is a three-way call, the method proceeds to step 684, where feature server 26 subscribes to dynamic detection points in order to be notified when call agent 22 detects a subscribed detection point.

Feature server 26 sends a split leg command to call agent 22 at step 686. Call agent 22 creates originating objects 560 and breaks the voice path between telecommunications device A and telecommunications device B at step 688. Feature server 26 sends a collect information command at step 690. In response, call agent 22 sends a dial tone to the controller at step 692.

At step 694, call agent 22 receives digits representing a telephone number for third party telecommunications device C from the controller before a timer expires. At step 696, call agent 22 reports the digits to feature server 26. Feature server 26 sends a continue command at step 698. In response, call agent 22 creates terminating objects 562 at step 700. Call agent 22 alerts third party telecommunications device C of the call at step 702.

At step 704, call agent 22 receives a hookflash from the controller. At step 706, call agent 22 reports the hookflash to feature server 26. In response, feature server 26 sends a merge command to call agent 22 at step 708. Call agent 22 creates a three-way call between telecommunications devices A, B, and C at step 710.

Call agent 22 determines whether there is a hookflash or hang up from controller at step 712. If there is a hookflash, call agent 22 reports the hookflash to feature server 26 at step 714. Feature server 26 sends a disconnect command to disconnect telecommunications device C from the three-way call at step 716. In response, call agent 22 disconnects telecommunications device C at step 717. After disconnecting telecommunications device C, the method is terminated.

If a hang up is detected at step 712, the method proceeds to step 718, where call agent 22 reports the hang up to feature server 26. In response, feature server 26 sends a release command to release the three-way call at step 720. In response, call agent 22 releases the three-way call at step 722. After releasing the call, the method is terminated.

Selective Call Acceptance

Figure 28:
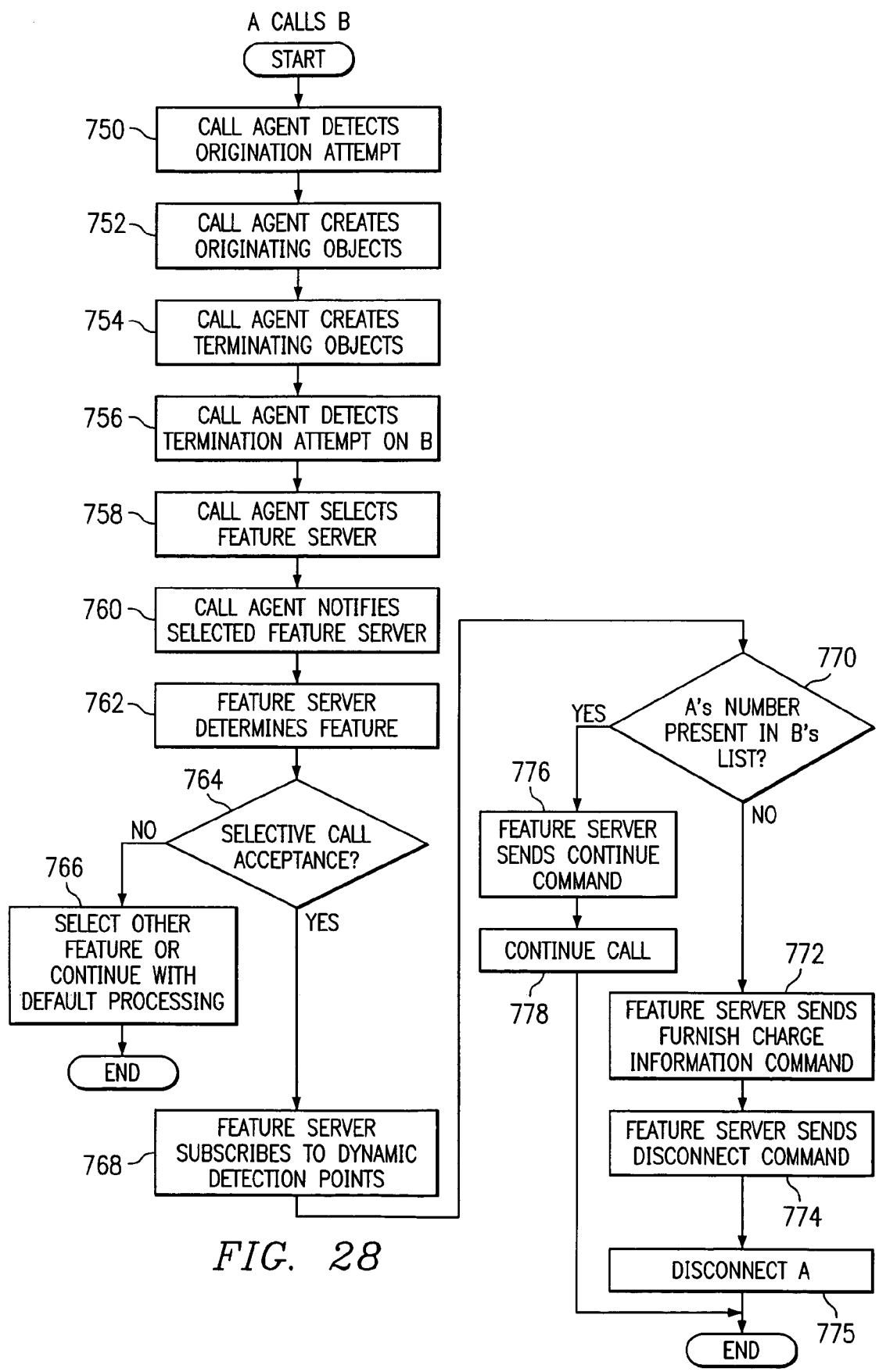
FIG. 28 is a flowchart illustrating one example of a method for providing a selective call acceptance feature.

FIG. 28 is a flowchart illustrating one example of a method for providing a selective call acceptance feature. The method provides for telecommunications device B to selectively accept calls from telephone numbers included on a selective call acceptance list associated with telecommunications device B.

The method begins at step 750. Steps 750 through 754 describe processing a call from telecommunications device A to telecommunications device B, and may be performed in a manner substantially similar to steps 600 through 604 of FIG. 26. At step 756, call agent 22 detects a termination attempt on telecommunications device B. Steps 758 through 762 describe determining whether selective call acceptance is an appropriate feature, and may be performed in a manner substantially similar to steps 620 through 626 of FIG. 26.

Feature server 26 determines whether selective call acceptance is an appropriate feature at step 764. If selective call acceptance is not an appropriate feature, the method proceeds to step 766, where another feature is selected or that call is continued with default call processing. The method is then terminated. If selective call acceptance is an appropriate feature, the method proceeds to step 768, where feature server 26 subscribes to dynamic detection points.

At step 770, feature server 26 determines whether a telephone number associated with telecommunications device A is included in the selective call acceptance list associated with telecommunications device B. If the number is not included, the method proceeds to step 772, where feature server 26 sends a furnish charge information command. At step 774, feature server 26 sends a disconnect command to call agent 22 to disconnect the call with telecommunications device A. In response, call agent 22 disconnects the call at step 775. After disconnecting the call, the method is terminated.

If the number is included in the selective call acceptance list at step 770, the method proceeds to step 776, where feature server 26 sends a continue command to call agent 22 to continue the call between telecommunications device A and telecommunications device B. In response, call agent 22 continues the call at step 778. After continuing the call, the method is terminated.

Selective Call Rejection

Figure 29:
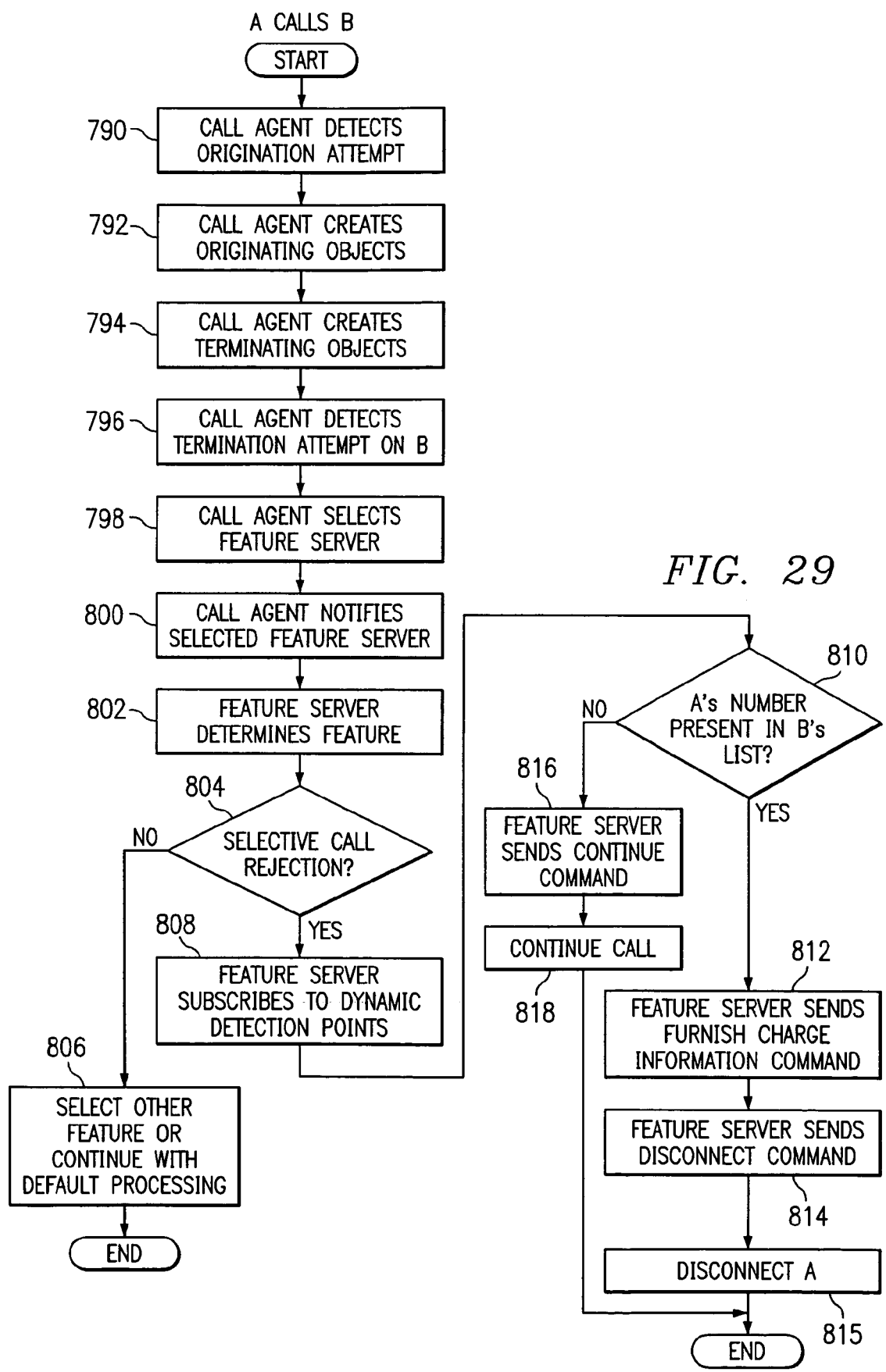
FIG. 29 is a flowchart illustrating one example of a method for providing a selective call rejection feature.

FIG. 29 is a flowchart illustrating one example of a method for providing a selective call rejection feature. The method provides for telecommunications device B to selectively reject calls from telephone numbers included on a selective call rejection list associated with telecommunications device B.

The method begins at step 790. Steps 790 through 794 describe processing a call from telecommunications device A to telecommunications device B, and may be performed in a manner substantially similar to steps 600 through 604 of FIG. 26. At step 796, call agent 22 detects a termination attempt on telecommunications device B. Steps 798 through 802 describe determining whether selective call rejection is an appropriate feature, and may be performed in a manner substantially similar to steps 620 through 626 of FIG. 26.

Feature server 26 determines whether selective call rejection is an appropriate feature at step 804. If selective call rejection is not an appropriate feature, the method proceeds to step 806, where another feature is selected or that call is continued with default call processing. The method is then terminated. If selective call rejection is an appropriate feature, the method proceeds to step 808, where feature server 26 subscribes to dynamic detection points.

At step 810, feature server 26 determines whether a telephone number associated with telecommunications device A is included in the selective call rejection list associated with telecommunications device B. If the number is included, the method proceeds to step 812, where feature server 26 sends a furnish charge information command. At step 814, feature server 26 sends a disconnect command to call agent 22 to disconnect the call with telecommunications device A. In response, call agent 22 disconnects the call at step 815. After disconnecting the call, the method is terminated.

If the number is not included in the selective call rejection list at step 810, the method proceeds to step 816, where feature server 26 sends a continue command to call agent 22 to continue the call between telecommunications device A and telecommunications device B. In response, call agent 22 continues the call at step 818. After continuing the call, the method is terminated.

Feature servers 26 may provide different feature sets to different subscribers. Feature servers 26 may also provide Class 5 features that typically require a public switch. Thus, features servers 26 may allow for a more flexible system 10.

A technical advantage of one example of the present invention may is that calls are represented in a database such as a shared memory using, for example, a half call model representation. A network component may process a call by accessing the database to determine a state of the call and to retrieve instructions for processing the call, which may allow for efficient call processing. Changes to call processing may be made by changing the instructions in the database, which allows for flexible call processing.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for providing a feature in a telecommunications network, comprising:
   receiving a plurality of signals representing a call at a call agent to generate a detection point, the call associated with a service identifier corresponding to a set of features;
   identifying a feature server from a plurality of feature servers;
   notifying the identified feature server of the detection point; and
   processing the signals in response to the detection point to provide a feature from the set of features.

2. The method of claim 1, further comprising:
   determining a terminal identifier associated with the signals;
   determining the detection point associated with the signals; and
   retrieving the service identifier from a table associating the terminal identifier and the detection point with the service identifier.

3. The method of claim 1, further comprising:
   determining a subscriber identifier associated with the signals;
   determining the detection point associated with the signals; and
   retrieving the service identifier from a table associating the subscriber identifier and the detection point with the service identifier.

4. The method of claim 1, further comprising:
   determining a terminal identifier associated with the signals;
   determining a subscriber identifier from the terminal identifier;
   determining the detection point associated with the signals; and
   retrieving the service identifier from a table associating the subscriber identifier and the detection point with the service identifier.

5. The method of claim 1, wherein identifying the feature server comprises:
   determining a subscriber identifier associated with the signals;
   determining the service identifier according to the detection point and the subscriber identifier; and
   identifying a feature server associated with the service identifier.

6. The method of claim 1, wherein identifying the feature server comprises:
   determining a subscriber identifier associated with the signals;
   determining a plurality of service identifiers according to the detection point and the subscriber identifier;
   selecting a service identifier according to a priority; and
   identifying a feature server associated with the selected service identifier.

7. A system for providing a feature in a telecommunications network, comprising:
   a plurality of feature servers; and
   a call agent operable to:
      receive a plurality of signals representing a call at a call agent to generate a detection point, the call associated with a service identifier corresponding to a set of features;

identify a feature server from a plurality of feature servers;

notify the identified feature server of the detection point; and process the signals in response to the detection point to provide a feature from the set of features.

8. The system of claim 7, wherein the call agent is operable to:

determine a terminal identifier associated with the signals;

determine the detection point associated with the signals; and retrieve the service identifier from a table associating the terminal identifier and the detection point with the service identifier.

9. The system of claim 7, wherein the call agent is operable to:

determine a subscriber identifier associated with the signals;

determine the detection point associated with the signals; and retrieve the service identifier from a table associating the subscriber identifier and the detection point with the service identifier.

10. The system of claim 7, wherein the call agent is operable to:

determine a terminal identifier associated with the signals;

determine a subscriber identifier from the terminal identifier;

determine the detection point associated with the signals; and retrieve the service identifier from a table associating the subscriber identifier and the detection point with the service identifier.

11. The system of claim 7, wherein the call agent is operable to identify the feature server by:

determining a subscriber identifier associated with the signals;

determining the service identifier according to the detection point and the subscriber identifier; and identifying a feature server associated with the service identifier.

12. The system of claim 7, wherein the call agent is operable to identify the feature server by:

determining a subscriber identifier associated with the signals;

determining a plurality of service identifiers according to the detection point and the subscriber identifier;

selecting a service identifier according to a priority; and identifying a feature server associated with the selected service identifier.

13. Logic for providing a feature in a telecommunications network, the logic encoded in a medium and operable to:

receive a plurality of signals representing a call at a call agent to generate a detection point, the call associated with a service identifier corresponding to a set of features;

identify a feature server from a plurality of feature servers;

notify the identified feature server of the detection point; and process the signals in response to the detection point to provide a feature from the set of features.

14. The logic of claim 13, wherein the logic is operable to:

determine a terminal identifier associated with the signals;

determine the detection point associated with the signals; and retrieve the service identifier from a table associating the terminal identifier and the detection point with the service identifier.

15. The logic of claim 13, wherein the logic is operable to:

determine a subscriber identifier associated with the signals;

determine the detection point associated with the signals; and retrieve the service identifier from a table associating the subscriber identifier and the detection point with the service identifier.

16. The logic of claim 13, wherein the logic is operable to:

determine a terminal identifier associated with the signals;

determine a subscriber identifier from the terminal identifier;

determine the detection point associated with the signals; and retrieve the service identifier from a table associating the subscriber identifier and the detection point with the service identifier.

17. The logic of claim 13, wherein the logic is operable to identify the feature server by:

determining a subscriber identifier associated with the signals;

determining the service identifier according to the detection point and the subscriber identifier; and identifying a feature server associated with the service identifier.

18. The logic of claim 13, wherein the logic is operable to identify the feature server by:

determining a subscriber identifier associated with the signals;

determining a plurality of service identifiers according to the detection point and the subscriber identifier;

selecting a service identifier according to a priority; and identifying a feature server associated with the selected service identifier.

19. A system for providing a feature in a telecommunications network, comprising:

means for receiving a plurality of signals representing a call at a call agent to generate a detection point, the call associated with a service identifier corresponding to a set of features;

means for identifying a feature server from a plurality of feature servers;

means for notifying the identified feature server of the detection point; and means for processing the signals in response to the detection point to provide a feature from the set of features.

20. The system of claim 19, further comprising:

means for determining a terminal identifier associated with the signals;

means for determining the detection point associated with the signals; and means for retrieving the service identifier from a table associating the terminal identifier and the detection point with the service identifier.

21. The system of claim 19, further comprising:

means for determining a subscriber identifier associated with the signals;

means for determining the detection point associated with the signals; and means for retrieving the service identifier from a table associating the subscriber identifier and the detection point with the service identifier.

22. The system of claim 19, further comprising:
means for determining a terminal identifier associated with the signals;
means for determining a subscriber identifier from the terminal identifier;
means for determining the detection point associated with the signals; and
means for retrieving the service identifier from a table associating the subscriber identifier and the detection point with the service identifier.

23. The system of claim 19, wherein the means for identifying the feature server is operable to:
determine a subscriber identifier associated with the signals;
determine the service identifier according to the detection point and the subscriber identifier; and
identify a feature server associated with the service identifier.

24. The system of claim 19, wherein the means for identifying the feature server is operable to:
determine a subscriber identifier associated with the signals;
determine a plurality of service identifiers according to the detection point and the subscriber identifier;
select a service identifier according to a priority; and
identify a feature server associated with the selected service identifier.

25. A method for providing a feature in a telecommunications network, comprising:
receiving a plurality of signals representing a call at a call agent to generate a detection point, the call associated with a service identifier corresponding to a set of features;
determining a terminal identifier associated with the signals;
determining a subscriber identifier from the terminal identifier;
determining the detection point associated with the signals;
retrieving the service identifier from a table associating the subscriber identifier and the detection point with the service identifier;
identifying a feature server from a plurality of feature servers by:
determining a plurality of service identifiers according to the detection point and the subscriber identifier;
selecting a service identifier according to a priority; and
identifying a feature server associated with the selected service identifier;
notifying the identified feature server of the detection point; and
processing the signals in response to the detection point to provide a feature from the set of features.

26. A method for providing a feature in a telecommunications network, comprising:
processing a plurality of signals representing a first call between a first telecommunications device and a second telecommunications device using a call agent;
detecting an origination attempt by a third telecommunications device;
notifying a feature server of the first call and the origination attempt;
subscribing the feature server to a detection point;
notifying the feature server of the detection point; and
activating a second call between the second telecommunications device and the third telecommunications device in response to the notification using the feature server.

27. The method of claim 26, wherein notifying the feature server of the first call and the origination attempt comprises transmitting a busy message to the feature server.

28. The method of claim 26, wherein the detection point comprises a hookflash.

29. The method of claim 26, wherein activating the second call between the second telecommunications device and the third telecommunications device comprises:
establishing a communication path between the second telecommunications device and the third telecommunications device in response to a command from the feature server; and
activating the second call using the call agent.

30. A method for providing a feature in a telecommunications network, comprising:
creating a first call object for a first telecommunications device using a call agent;
creating a second call object for a second telecommunications device;
processing a first call between the first telecommunications device and the second telecommunications device by associating the first call object with the second call object;
detecting an origination attempt by a third telecommunications device;
creating a third call object for the third telecommunications device;
notifying a feature server of the first call and the origination attempt;
associating the third call object with the second call object;
subscribing the feature server to a detection point;
notifying the feature server of the detection point; and
activating a second call between the second telecommunications device and the third telecommunications device in response to the notification.

31. The method of claim 30, wherein notifying the feature server of the first call and the origination attempt comprises transmitting a busy message to the feature server.

32. The method of claim 30, wherein the detection point comprises a hookflash.

33. The method of claim 30, wherein activating the second call comprises:
establishing a communication path between the second telecommunications device and the third telecommunications device in response to a command from the feature server; and
activating the second call using the call agent.

34. A system for providing a feature in a telecommunications network, the system comprising:
a call agent operable to:
process a first call between a first telecommunications device and a second telecommunications device;
detect an origination attempt by a third telecommunications device;
transmit a notification of the first call and the origination attempt;
a feature server coupled to the call agent and operable to:
receive the notification of the first call and the origination attempt;
subscribe to a detection point from the call agent;

receive a report of the detection point; and
activate a second call between the second telecommunications device and the third telecommunications device in response to the notification.

35. The system of claim 34, wherein the notification of the first call and the origination attempt comprises a busy message.

36. The system of claim 34, wherein the detection point comprises a hookflash.

37. The system of claim 34, wherein the feature server is operable to command the call agent to activate the second call by:
establishing a communication path between the second telecommunications device and the third telecommunications device; and
activating the call.

* * * * *